United States Patent
Sawant

(10) Patent No.: US 10,959,436 B2
(45) Date of Patent: Mar. 30, 2021

(54) CROP FORTIFICATION, NUTRITION AND CROP PROTECTION COMPOSITION

(71) Applicant: Arun Vitthal Sawant, Maharashtra (IN)

(72) Inventor: Arun Vitthal Sawant, Maharashtra (IN)

( * ) Notice: Subject to any disclaimer, the term of this patent is extended or adjusted under 35 U.S.C. 154(b) by 55 days.

(21) Appl. No.: 16/035,604

(22) Filed: Jul. 14, 2018

(65) Prior Publication Data
US 2019/0014788 A1 Jan. 17, 2019

(30) Foreign Application Priority Data
Jul. 15, 2017 (IN) .............................. 201721025178

(51) Int. Cl.
| | | |
|---|---|---|
| *A01N 65/03* | (2009.01) | |
| *A01N 25/04* | (2006.01) | |
| *C05F 11/08* | (2006.01) | |
| *C05G 3/60* | (2020.01) | |
| *C05G 3/70* | (2020.01) | |
| *C05G 5/23* | (2020.01) | |

(52) U.S. Cl.
CPC ............. *A01N 65/03* (2013.01); *A01N 25/04* (2013.01); *C05F 11/08* (2013.01); *C05G 3/60* (2020.02); *C05G 3/70* (2020.02); *C05G 5/23* (2020.02)

(58) Field of Classification Search
CPC ........ A01N 25/02; A01N 65/03; A01N 63/00; A01N 65/20; C05F 11/02; C05G 3/90
See application file for complete search history.

(56) References Cited

U.S. PATENT DOCUMENTS

| 4,774,186 A | 9/1988 | Schaefer et al. |
| 6,375,968 B1 * | 4/2002 | Quong ................... A01N 25/28 424/407 |
| 2005/0119127 A1 * | 6/2005 | Cambri ................... C05F 11/00 504/172 |

FOREIGN PATENT DOCUMENTS

| CN | 101555177 A | 10/2009 |
| CN | 102775229 A | 11/2012 |
| CN | 2012-A09482 | * 10/2014 |
| JP | 2000264809 A | 9/2000 |
| WO | 2011031287 A1 | 3/2011 |

OTHER PUBLICATIONS

Jerence J. Painter, "Carbohydrate polymers in desert reclamation: the potential of microalgal biofertilizers", Carbohydrate Polymer, vol. 20, Issue 2, pp. 77-83, 1993.
Search Report and Written Opinion issued in corresponding PCT Application No. PCT/IB2018/055225.

* cited by examiner

*Primary Examiner* — Johann R Richter
*Assistant Examiner* — Danielle Sullivan
(74) *Attorney, Agent, or Firm* — Ladas & Parry LLP

(57) ABSTRACT

The invention relates to an algal composition in the form of an aqueous suspension. More particularly the invention relates to aqueous suspension composition including one or more algae selected from green algae, red algae, golden algae, brown algae, golden-brown algae, blue algae, blue-green algae or their species in the range of 0.1%-65% by weight with one or more surfactants in the range of 0.1%-50% by weight; with one or more structuring agent in the range of 0.01%-5% by weight, where the composition has a particle size range of from 0.1 micron to 60 microns. Furthermore, the invention relates to a process of preparing the algal composition comprising at least one alga and at least one agrochemically acceptable excipient in the form of an aqueous suspension. The invention further relates to a method of treating the plants, seeds, crops, plant propagation material, locus, parts thereof or the soil with the algal composition in the form of aqueous suspension.

12 Claims, 1 Drawing Sheet

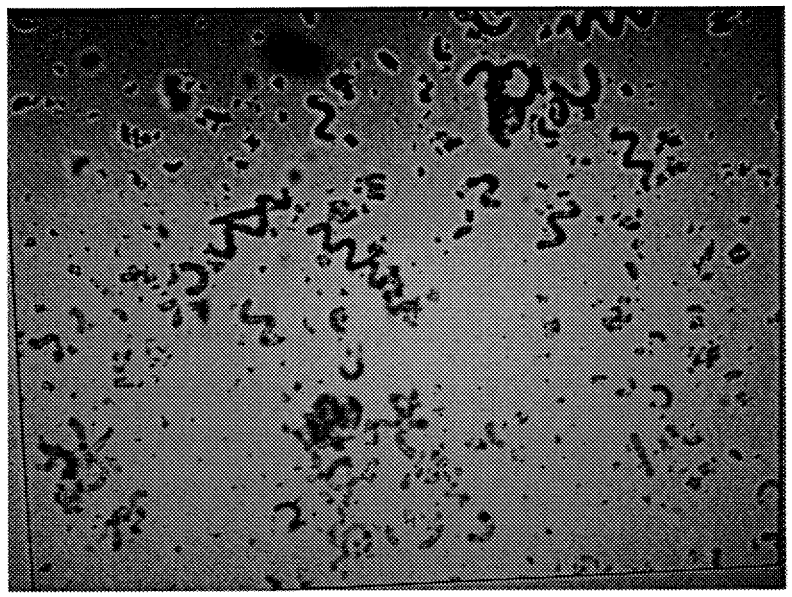
FIGURE: 1
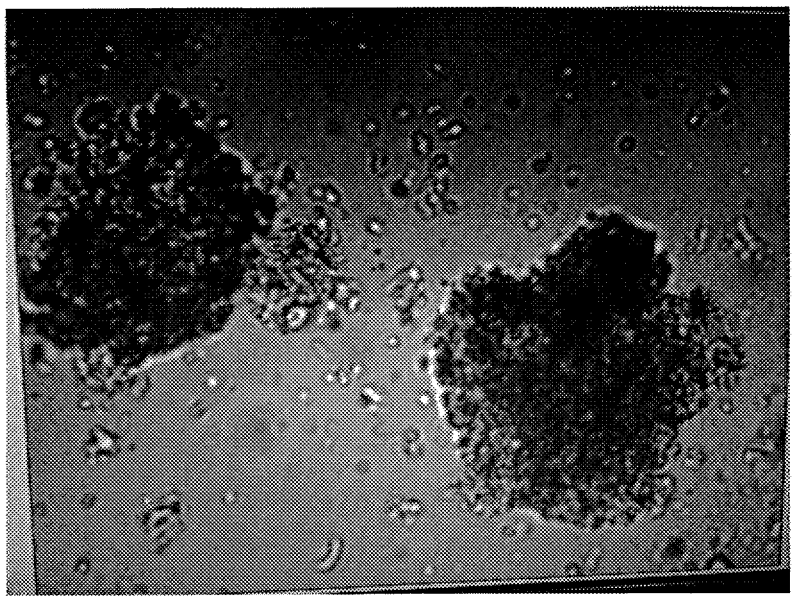
FIGURE: 2

CROP FORTIFICATION, NUTRITION AND CROP PROTECTION COMPOSITION

FIELD OF THE INVENTION

The invention relates to algal composition in the form of an aqueous suspension. More particularly, the invention relates to aqueous suspension composition including one or more algae selected from green algae, red algae, golden algae, brown algae, golden-brown algae, blue algae, blue-green algae or their species and mixtures thereof, wherein the at least one algae is present in the range of 0.1%-65% by weight, with one or more surfactant in the range of 0.1%-50% by weight; with one or more structuring agent in the range of 0.01%-5% by weight. The invention further relates to an aqueous suspension which includes one or more of algae with one or more surfactants and structuring agents with particles in the size range of about 0.1-60 microns. Furthermore, the invention relates to a process of preparing the algal composition comprising at least one alga and at least one agrochemically acceptable excipient in the form of an aqueous suspension. The invention further relates to a method of treating the plants, seeds, crops, plant propagation material, locus, parts thereof or the soil with the algal composition in the form of an aqueous suspension.

DESCRIPTION OF THE RELATED ART

In describing the embodiments of the invention, specific terminology is chosen for the sake of clarity. However, it is not intended that the invention be limited to the specific terms so selected and it is to be understood that each specific term includes all technical equivalents that operate in a similar manner to accomplish a similar purpose.

Several agrochemical agents are being used at high dosages for long periods of time as fertilizers and for countering pests and diseases. These agrochemical agents are a constant burden on the environment as they contaminate soil, water, turf, and other vegetation. In addition to countering pests and diseases, they can be toxic to a host of other organisms including birds, fishes, beneficial insects, and non-target plants. Most of the agrochemical agents leach into soils and groundwater which can also end up in drinking water and may also pollute the air.

Also, nutrient losses in agriculture are not just a cause for concern due to economics, but also due to environmental reasons.

Biological materials such as algae, fungi and bacteria are useful alternatives to chemical agents for improvement and/or maintenance of soil nutrients as well as to control the pests.

Algal products have been known to be used as fertilizers and plant nutrients and to control pests. However, their use needs to be optimized and their application needs to be improved in order to provide an economical result to the farmer and also reduce the burden on the environment.

Surprisingly, the inventors of the present application have determined that algal formulations in the form of an aqueous suspension provides excellent results in terms of yield, plant growth, vitality, vigor and crop protection.

Also, commercially available formulations tend to either settle or sediment at the bottom of the packaging or the container from which it is to be applied thereby failing to exhibit desired spreadability, causing problems in application in drip irrigation, and lack uniform distribution of the components to the crops for right uptake. These prior art compositions cannot be applied through drip or sprinkler irrigation easily and this poses a big application challenge in agriculture.

While microbial organisms are not viable under high shear, surprisingly the inventors have determined that a composition comprising at least one algae and at least one surfactant and structuring agent, with a particle size of 0.1 microns to 60 microns, demonstrates superior physical characteristics such as suspensibililty, dispersibility, pourability and thereby superior field efficacy at reduced application rates. These superior characteristics of the product demonstrates excellent superior field efficacy, for e.g. in the uptake of nutrients from the soil without the need of using any chemical products such as urea or for instance provides greater prophylactic control over plant pathogenic disease. The compositions demonstrated superior performance under accelerated storage and also surprisingly be used in drip irrigation.

SUMMARY OF THE INVENTION

The invention relates to algal compositions in the form of an aqueous suspension. More particularly, the invention relates to algal composition comprising at least one alga, and at least one surfactant and at least structuring agent. The invention further relates to composition including one or more algae in a concentration range of 0.1% to 65% by weight of the total composition, with one or more surfactant in the range of 0.1%-50% by weight of the total composition, and one or more structuring agent in the range of 0.01%-5% by weight of the total composition. The algal composition in the form of the aqueous suspension includes particles in the size range of 0.1 microns to 60 microns. According to an embodiment, the algal composition includes one or more of green algae, red algae, golden algae, brown algae, golden-brown algae, blue algae, blue-green algae or their species and mixtures thereof.

Furthermore, the invention relates to a process of preparing the algal composition comprising at least one algae and at least one agrochemically acceptable excipient in the form of an aqueous suspension. The invention further relates to a method of treating the plants, seeds, seedlings, crops, plant propagation material, locus or parts thereof or the soil with the algal composition in the form of an aqueous suspension.

According to an embodiment, the invention further relate to the use of the algal composition in the form of an aqueous suspension as at least one of a nutrient composition, a plant strengthener composition, a soil conditioner composition, plant fortification, plant protection and a yield enhancer composition.

According to an embodiment, the invention further relates to a method of improving the plant health, improving the plant nutrition, fortifying the plant, protecting the plant, enhancing the plant yield, protecting the crops, or conditioning the soil; the method comprising treating at least one of the seeds, seedling, crops, a plant, plant propagation material, locus or parts thereof or the surrounding soil with an effective amount of the algal composition in the form of an aqueous suspension comprising at least one alga and at least one agrochemically acceptable excipient.

It was also observed that the composition exhibited good physical and chemical properties, good release properties, enhanced stability even at extended storage under higher temperatures.

BRIEF DESCRIPTION OF THE DRAWINGS

For a more complete understanding of the invention, reference should now be made to the embodiments illustrated in greater detail in the accompanying drawings and described by way of embodiments of the invention.

FIG. 1: illustrates a microscopic image of raw spirulina at 10× magnification.

FIG. 2: illustrates a microscopic image at 10× magnification, of a composition in the form suspension concentrate comprising spirulina, according to an embodiment of the present invention.

DESCRIPTION OF THE INVENTION

In describing the embodiment of the invention, specific terminology is chosen for the sake of clarity. However, it is not intended that the invention be limited to the specific terms so selected and it is to be understood that each specific term includes all technical equivalents that operate in a similar manner to accomplish a similar purpose.

According to the invention, the term "aqueous suspension" can be defined as a stable suspension of a composition in a fluid usually intended for dilution with water before use. Further the term or phrase "aqueous suspension" can also encompass "aqueous dispersion" or "suspension concentrate".

It is well known that microorganisms including bacteria, fungi and algae are not viable when subjected to high shear, and microbial cells tend to get lysed when subjected to shear. FIG. 1. depicts an image of pure or raw spirulina, which shows a large number of living cells. During preparation of the suspension concentrate according to an embodiment of the present invention, the algae undergoes high shear resulting in the lysis of the cell as shown in the FIG. 2. However, despite the fact that the cells are lysed, it is surprisingly observed that the suspension concentrate comprising the algae, according to the current invention, demonstrate excellent efficacy when applied to the seeds, seedling, crops, a plant, plant propagation material, locus, parts thereof or to the surrounding soil.

The invention relates to an algal composition comprising at least one algae and at least one agrochemically acceptable excipient in the form of aqueous suspension. The invention particularly relates to an algal composition in the form of an aqueous suspension which includes algae in a concentration range of 0.1%-65% by weight of the total composition. The composition includes agrochemically acceptable excipient comprising one or more surfactants in the concentration range of 0.1%-50% by weight of the total composition; and or more structuring agents in the concentration range of 0.1%-5% by weight of the total composition; the aqueous suspension includes particles in the size range of 0.1 microns to 60 microns. According to an embodiment, the algal composition includes one or more of green algae, red algae, golden algae, brown algae, golden-brown algae, blue algae, blue-green algae or their species and mixtures thereof.

The inventors have further determined that the composition of the present invention surprisingly has good pourability, provides ease of handling and also reduces the loss of material while handling the product at the time of packaging as well as during field application. Surprisingly, the inventors have also determined that the suspension concentrate composition display superior efficacy at reduced dosages compared to prior art composition.

According to another embodiment, the algae is microalgae, salt water algae or fresh water algae or species, derivatives or mixtures thereof.

According to further embodiment, the algae is at least one belonging to the group selected from green algae, red algae, golden algae, brown algae, golden-brown algae, blue algae or their species and mixtures thereof.

According to still further embodiment, the algae is at least one selected from the division, but not limited to Cyanobacteria, Ochrophytes, Glaucophytes, Rhodoplasts, Rhodophytes, Chloroplasts, Chrysophyta, Synurophytes, Silicoflagellata, Heterokonts, Crytophytes, Haptophytes, Euglenophytes, Chlorophytes, Charophytes, Land Plants, Embrophyta Or Chlorarachniophytes or their derivatives, species and mixtures thereof. However, those skilled in the art will appreciate that it is possible to utilize any other algae known in the art from other divisions, without departing from the scope of the invention.

According to a further embodiment, the algae is least one selected from the family, but not limited to Bryopsidaceae, Acrotylaceae, Areschougiaceae, Cystocloniaceae, Dicranemataceae, Hypneaceae, Dumontiaceae, Caulerpaceae, Codiaceae, Halimedaceae, Udoteaceae, Anadyomenaceae, Polyphysaceae, Siphonocladaceae, Valoniaceae, Ulvaceae, Florideophyceae, Chordariaceae, Punctariaceae, Dictyotaceae, Ectocarpaceae, Rhodymeniaceae, Gelidiaceae, Cystoseiraceae, Sargassaceae, Sporochnaceae, Sphacelariaceae, Scytosiphonaceae, Alariaceae, Gracilariaceae, Rhizophyllidaceae, Porphyridiaceae, Phaeophyceae, Raphidiophyceae, Eumastigophyceae, Xanthophyceae, Sarcinochrysophyceae, Acrochaetiaceae, Bonnemaisoniaceae, Ceramiaceae, Dasyaceae, Rhodomelaceae, Delesseriaceae, Phacelocarpaceae, Halymeniaceae, Liagoraceae, Chrysomonadales, Chrysocapsales, Chrysosphaerales, Chrysotrichales, Heterokontae, Diatomeae, Galaxauraceae, Plocamiaceae, Champiaceae, Sebdeniaceae, Lomentariaceae, Peyssonneliaceae, Nizymeniaceae, Kallymeniaceae, Corallinaceae, Nemastomataceae Prymnesiophycées, Choristocarpaceae, Discosporangiaceae, Petrodermataceae, Syringodermataceae, Onslowiaceae, Dictyotaceae, Lithodermataceae, Eustigmatophyte, Phaeostrophionaceae, Sphacelodermaceae, Stypocaulaceae, Cladostephaceae, Sphacelariaceae, Asterocladaceae, Lessoniaceae, Ascoseiraceae, Cutleriaceae, Eklonia, Arthrocladiaceae, Desmarestiaceae, Acinetosporaceae, Adenocystaceae, Prasinophyceae, Chordariaceae, Chordariopsidaceae, Ectocarpaceae, Mesosporaceae, Myrionemataceae, Pylaiellaceae, Bifurcariopsidaceae, Durvillaeaceae, Fucaceae, Himanthaliaceae, Hormosiraceae, Notheiaceae, Sargassaceae, Seirococcaceae, Akkesiphyceae, Alariaceae, Chordaceae, Costariaceae, Pseudochordaceae, Nemodermataceae, Neoralfsiaceae, Ralfsiaceae, Chnoosporaceae, Scytosiphonaceae, Splachnidiaceae, Sporochnaceae, Halosiphonaceae, Masonophycaceae, Phyllariaceae, Stschapoviaceae, Tilopteridaceae, Heterochordariaceae, Bacillariophyceae, Aminariaceae, or their derivatives, species and mixtures thereof. However, those skilled in the art will appreciate that it is possible to utilize any other algae known in the art from other family, without departing from the scope of the invention.

According to still further embodiment, the algae is at least one belonging to the genus selected from, but not limited to *Nitzschia* Sp., *Navicula* Sp., *Ahnfeltia* Sp., *Anikstrodesmis* Sp., *Arthrospira* Sp., *Nannochloris* Sp. *Asteromenia* Sp., *Botryocladia* Sp., *Chlorella* Sp., *Haematococcus* Sp., *Dunaliella* Sp., *Selenasirum* Sp., *Nannochhropsis* Sp., *Scenedesm* Sp., *Graciaria* Sp., *Nemastoma* Sp., *Amphora* Sp., *Oehromonas* Sp. *Cyanidioschyzon* Sp., *Caulerpa* Sp., *Dictyosphaeria* Sp., *Haliptilon* Sp., *Atractophora* Sp., *Valonia* Sp., *Boodlea* Sp., *Gymnopilus* sp., *Melanothamnus* sp., *Turbeneria* sp., *Mastigocladopsis* sp., *Gelidiella* Sp., *Ceratodictyon* Sp., *Pneophyllum* Sp., *Kallymenia* Sp., *Predaea*

Sp, Siphonocladus Sp., Cladophoropsis Sp., Amphiplexia Sp., Lemanea Sp., Mesophyllum Sp., Palmaria Sp., Cladosiphon Sp., Schmitzia Sp., Colpomenia Sp., Cryptophycées Sp., Spirulina Sp., Oscillatoria Sp., Phormidium Sp., Gloeocapsa Sp., Cyanospira Sp., Lyngbya Sp., Cylindrospermum Sp., Tolypothrix Sp., Hapalosiphon Sp., Aulosira Sp., Phortmdium Sp., Synechocystis Sp., Aphanocapsa Sp., Cyanothece Sp., Planktothricoides Sp., Prochlorococcus Sp., Prochloron Sp., Prochlorothrix Sp., Gloeothece Sp., Heterokontophyta Sp., Calothrix Sp., Rivularia Sp., Microcoleus Sp., Schizothrix Sp., Microcystis Sp., Metagoniolithon Sp., Hydrolithon Sp., Hypoglossum Sp., Seirospora Sp., Jania Sp., Metamastophora Sp., Amphiroa Sp., Acanthophora Sp., Chondrus Sp., Cottoniella Sp., Pleonosporium Sp., Ditria Sp., Endosiphonia Sp., Doxodasya Sp., Drewiana Sp., Dictyomenia Sp., Antithamnion Sp., Platysiphonia Sp., Heterodoxia Sp., Dasyclonium Sp., Chondria Sp., Haraldiophyllum Sp., Aglaothamnion Sp., Struvea Sp., Sarcomenia Sp., Acrothamnion Sp., Martensia Sp., Lejolisia Sp., Haloplegma Sp., Griffithsia Sp., Glaphrymenia Sp, Dasya Sp., Acrosorium Sp., Spyridia Sp., Hemineura Sp., Wrangelia Sp., Trithamnion Sp., Dasyphila Sp., Claudea Sp., Corallophila Sp., Perischelia Sp., Monosporus Sp., Carpothamnion Sp., Guiryella Sp., Gattya Sp., Mastocarpus Sp., Anotrichium Sp., Centroceras Sp., Ceramium Sp., Caulerpa Sp., Vanvoorstia Sp., Euptilocladia Sp., Titanophora Sp., Tanakaella Sp., Asparagopsis Sp., Lithophyllum Sp., Acrochaetium Sp., Euptilota Sp., Audouinella Sp., Botryococcus Sp., Actmanthes Sp., Ahnfeltiopsis Sp., Agmenemum Sp., Cochlodinium Sp., Amphiprora Sp., Anftistrodesmus Sp., Ammsirodesnms Sp., Borodinetta Sp., Carteria Sp., Stylonema Sp., Chaetoceros Sp., Chlamydomas Sp., Chlorococcuni Sp., Chlorogoni Sp., Chroomonas Sp., Chrysosphaera Sp., Ciicosphaera Sp., Crypthecodinium Sp., Cryptomonas Sp., Cyclotella Sp., Dimaliella Sp., Eremosphaera Sp., Ellipsoidon Sp., Euglena Sp., Franceia Sp., Fragilaria Sp., Gleocapsa Sp., Gloeothamnion Sp., Hymenomonas Sp., Bockrysis Sp., Hochrysis Sp., Lepocinclis Sp., Stauroneis Sp., Micraclinium Sp., Chrysymenia Sp., Micractinhnn Sp., Monaraphidium Sp., Nannochloris Sp., Navicida Sp., Porphyridium Sp., Nizymania Sp., Scenedesmus Sp., Synechoccus Sp. Navicul Sp., Nephrochloris Sp., Odontella Sp., Muriellopsis Sp., Tschia Sp., Nitzschia Sp., Isochrysis Sp., Phaedactylum Sp., Aphanizomenon flos Sp., Ochromonas Sp., Oocyst Sp., Bacillariophyceae Sp., Pamchlorelta Sp., Peyssonnelia Sp., Pascheria Sp., Pavlova Sp., Phaeodactyhan Sp., Cylindrotheca Sp., Anacystis Sp., Ertilissima Sp., Platytnonas Sp., Pleurochrysis Sp., Leptolyngbya Sp., Neochloris Sp., Prototheca Sp., Pseudochlorella Sp., Hormotilopsis Sp., Gyrodinium Sp., Ellipsoidion Sp., Pyramimonas Sp., Pyrobotrys Sp., Sarcinoid Sp., Aminariaceae Sp., Schizochytrmm Sp., Spirogyra Sp., Stichococcus Sp., Synechococcas Sp., Tagetes Sp., Tetraedron Sp., Tetraselmis Sp., Thalassiosira Sp., Viridiella Sp., Alaria Sp., Saccharina Sp., Coelarthrum Sp., Nereocystis Sp., Laminaria Sp., Porphyra Sp., Phaeocystis Sp., Phacelocarpus Sp., Ulva Sp., Himanthalia Sp., Ascophyllum Sp., Focus Sp., Kappaphycus Sp., Betaphycus Sp., Gelidium Sp., Blastophysa Sp., Pedinomonas Sp., Resultor Sp., Marsupiomonas Sp., Chlorokybus Sp., Coleochaete Sp., Awadhiella Sp., Prymnesiophycées Sp., Radioramus Sp., Conochaete Sp., Choristocarpaceae Sp., Lithothamnion Sp., Phymatolithion Sp., Discosporangiaceae Sp., Ishigeaceae Sp., Petrodermataceae Sp., Syringodermataceae Sp., Portieria Sp., Onslowiaceae Sp., Dictyotaceae Sp., Lithodermataceae Sp., Eustigmatophyte Sp., Phaeostrophionaceae Sp., Amphidinum Sp., Sphacelodermaceae Sp., Micractinium Sp., Sargassum Sp., Curdiea Sp., Stypocaulaceae Sp., Coelothrix Sp., Cladostephaceae Sp., Sphacelariaceae Sp., Fucus Sp., Asterocladaceae Sp., Lessoniaceae Sp., Ascoseiraceae Sp., Cutleriaceae Sp., Eklonia Sp., Arthrocladiaceae Sp., Desmarestiaceae Sp., Acinetosporaceae Sp., Adenocystaceae Sp., Chlamydomonas Sp., Cladophora Sp., Prasinophyceae Sp., Chordariaceae Sp., Chordariopsidaceae Sp., Gelidiopsis Sp., Agmenellum Sp., Desmodesmus Sp., Ectocarpaceae Sp., Mesosporaceae Sp., Halydris Sp., Myrionemataceae Sp., Pylaiellaceae Sp., Bifurcariopsidaceae Sp., Chlorococcum Sp., Durvillaeaceae Sp., Fucaceae Sp., Glossomastix Sp., Himanthaliaceae Sp., Iridaea Sp., Hormosiraceae Sp., Notheiaceae Sp., Sargassaceae Sp., Acrosiphonia Sp., Seirococcaceae Sp., Goniochloris Sp., Emiliana Sp., Codium Sp., Akkesiphycaceae Sp., Alariaceae Sp., Monochrysis Sp., Palma Sp., Chordaceae Sp., Acetabularia Sp., Phaffia Sp., Costariaceae Sp., Platymonia Sp., Pseudochordaceae Sp., Nemodermataceae Sp., Neoralfsiaceae Sp., Mphora Sp., Rhodymenia Sp., Ralfsiaceae Sp., Analipus Sp., Chnoosporaceae Sp., Egregia Sp., Scytosiphonaceae Sp., Chaetomorph Sp., Scytothamnaceae Sp., Gymnogongrus Sp., Asperococcus Sp., Bryopsis Sp., Rhizoclonium Sp., Gloiocladia Sp., Ecklonia Sp, Girgatina Sp., Hymenocladia Sp., Lomentaria Sp., Schizochytrium Sp., Aphanotece Sp., Splachnidiaceae Sp., Sporochnaceae Sp., Plocamium Sp., Constantinea Sp., Cryptosiphonia Sp., Webervanboassea Sp., Lessoniopsis Sp., Chondracanthus Sp., Halosiphonaceae Sp., Dictyopteris Sp., Farlowia Sp., Anadyomene Sp., Apelvetia Sp., Endocladia Sp., Corallin Sp., Thraustochytrium Sp., Osmundea Sp., Callophyllis Sp. M Calliarthron Sp., Monoraphidium Sp., Penicillus Sp., Meristotheca Sp., Wrack Sp., Cosmocladium Sp., Polysiphonia Sp., Prionitis Sp., Leathesia Sp., Polyneura Sp., Pelvetiopsis Sp., Chlamidonomas Sp., Neorhodomela Sp., Microdictyon Sp., Masonophycaceae Sp., Melobesia Sp., Dinoflagellate Sp., Delesseria Sp., Phyllariaceae Sp., Postelsia Sp., Microcladia Sp., Stschapoviaceae Sp., Dilsea Sp., Halimeda Sp., Chroococus Sp., Tilopteridaceae Sp., Phaeodactylum Sp., Semnocarpoa Sp., Champia Sp., Erythrophyllum Sp., Chodium Sp., Paonia Sp., Ulothrix Sp., Heterochordariaceae Sp., Gracilaria Sp., Phromidium Sp., Stypopodium Sp., Erythrocladia Sp., Bracchiomonas Sp., Coradophylum Sp., Cyanophyta Sp., Dysmorphococcus Sp., Cystoseira Sp., Dilophus Sp., Gloiotrichus Sp., Liagora Sp., Eisenia Sp., Ganonema Sp., Hennedya Sp., Codiophyllum Sp., Ecklonia Sp., Distromium Sp., Sparlingia Sp., Gastrocelonium Sp., Claviclonium Sp., Pelvetia Sp., Mazzaella Sp., Lobophora Sp., Pterocladia Sp., Scinaia Sp., Galaxaura Sp., Gloiopeltis Sp., Scillatoria Sp., Hypnea Sp., Hormophysa Sp., Dotyophycus Sp., Opuntiella Sp., Nannochloropsis. Sp., Myriodesma Sp., Tricleocarpa Sp., Trichogloea Sp., Yamadaella Sp., Sebdenia Sp., Gelinaria Sp., Prymnesium Sp., Herposiphonia Sp., Jeannerettia Sp., Kuetzingia Sp., Laurencia Sp., Lenormandiopsis Sp., Halymenia Sp., Eucheuma Sp., Erythroclonium Sp., Achnanthes Sp., Rhodopeltis Sp., Dudresnaya Sp., Halosaccion Sp., Zonaria Sp., Areschougia Sp., Hincksia Sp., Osmundaria Sp., Placophora Sp., Lophocladia Sp., Macrocystis Sp., Callophycus Sp., Epiphloea Sp., Acrosymphyton Sp., Cryptonemia Sp., Enteromorpha Sp., Neurymenia Sp., Lophosiphonia Sp., Protokuetzingia Sp., Leveillea Sp., Caulocystis Sp., Hydroclathrus Sp., Scaberia Sp., Rosenvingea Sp., Rhodella Sp., Spirocladia Sp., Acrochaetium Robustum Børgesen, Tolypiocladia Sp., Tylotus Sp., Dicranema Sp., Pachydictyon Sp., Austronereia Sp., Sporochnus Sp., Craspedocarpus Sp., Solieria Sp., Encyothalia Sp., Nanococcus Sp., Gracilaria Sp., Grateloupia Sp., Hildenbrandia sp., Amphiroa Sp., Cheilosporum Sp., Corallina Sp., Hydrolithon sp., Hydrolithon sp., Jania Sp., Lithophyllum sp., Catenella Sp., Chondracanthus Sp., Hypnea Flagelliformis sp., Ahnfeltiopsis Sp., Champia Sp., Gastroclonium Sp., Gelidiopsis Sp., Gayliellaflaccida sp., Aglaothamnion Sp., Crouania Sp., Ptilothamnion Sp., Dasya Sp., Caloglossa Sp., Aloglossa Sp., Erythroglossum Sp., Martensia Fragilis sp., Bostrychia Sp., Chondria Sp., Herposiphonia Sp., Laurencia Obtuse sp., Neosiphonia Sp., Polysiphonia Sp., Vaucheria Sp., Feldmannia sp., Hinksia Sp., Ralfsia Sp., Sphacelaria Sp., Canistrocarpus Sp., Dictyota Sp., Padina Sp., Spatoglossum Sp., Spatoglossum Sp., Stoechospermum Sp., Chnoospora Sp., Iyengaria Sp., Gayralia Sp., Chaetomorpha Sp., Cladophora Sp., Cladophoroposis Sp., Phyllodictyon Sp., Valoniopsis Sp., Bryopis Sp., Caulerpa Sp., Avrainvillea Sp., Chlorodesmis Sp., Petrocelis Sp., Ectocarpus Sp., Bossiella Sp. or derivatives and mixtures thereof. However, those skilled in the art will appreciate that it is possible to utilize any other genus of algae known in the art, without departing from the scope of the invention. The algae are commercially manufactured and available through various companies.

According to another embodiment, the algae is at least one species selected from, but not limited to: Anabena cylindrica, Bryopsis australis, Bryopsis minor, Botryococcus Braunii, Actmanthes Orientalis, Amphiprora Hyaline, Amphora Coffeiformis, Amphora Cqffeifoiinis Var. Linea, Chlorideila Simplex, Apelvetia Canaliculata, Caulerpa Taxifolia, Amphora Cqffeiformis Var. Punctata, Amphora Cqffeiformis Var. Taylori, Ulva Paschima Bast, Cladophora Goensis Bast, Laurencia Spectabilis, Gymnogongrus Crenulatus, Opuntiella Californica, Gymnogongrus Griffithsiae, Achnanthes Orientalis, Cladosiphon Filum, Goniochloris Sculpta, Ecklonia Cava, Osmundea Spectabilis, Lyngbya Majuscule, Oscillatoria Li.Nme.Tica, Oscillatoria Subbrevis, Tolypothrix Tenuis, Hapalosiphon Fontinalis, Spirulina Platensis, Spirulina Maxima, Eorhodomela Larix, Asperococcus Bullosus, Caulerpa Cactoides, Gelidium Micropterum, Caulerpa Cliftonii, Caulerpa Cupressoides, Caulerpa Fergusonii, Caulerpa Lentillifera, Caulerpa Mexicana, Ahnfeltia Plicata, Caulerpa Obscura, Caulerpa Racemosa, Caulerpa Racemosa Var. Corynephora, Caulerpa Racemosa Var. Laetivirens, Caulerpa Racemosa Var. Lamourouxii, Caulerpa Racemosa Var. Peltata, Caulerpa Serrulata, Caulerpa Simpliciuscula, Asteromena Peltata, Botryocladia Skottsbergii, Ceratodictyon Spongiosum, Chrysymenia Kaernbachii, Chrysymenia Ornata, Coelarthrum Cliftonii, Coelothrix Irregularis, Chara globularis, Gelidiopsis Variabilis, Gymnopilus edulis, Tetraselmis maculate, Prymnesium parvum, Chlamydomonas rheinhardii, Euglena gracilis, Caulerpa scalpelliformis, Padina pavonica, Sargassum tenerrimum, Urophora fasciata, Urophora lactuca, Sargassum wightii, Chondria armata, Caulerpa racemosa, Lyngby majuscule, Prasiola crispa, Gloiocladia Halymenioides, Pterocladia Capillacea, Gloiocladia Indica, Gloiocladia Rubrispora, Gloiosaccion Brownii, Gelidium Pusillum, Hymenocladia Usnea, Phymatolithion Calcereum, Lithothamnion Calcareoum, Herposiphonia Secunda, Herposiphonia Secunda F. Tenella, Heterostroma Nereidiis, Jeannerettia Lobata, Jeannerettia Pedicellata, Kuetzingia Canaliculata, Laurencia Brongniartia, Laurencia Cruciata, Laurencia Filiformis, Laurencia Majuscula, Laurencia Papillosa, Lenormandiopsis Latifolia, Leveillea Jungermannioides, Lophocladia Harveyi, Lophosiphonia Prostrata, Neurymenia Fraxinifolia, Osmundaria Spiralis, Placophora Binderi, Polysiphonia Decipiens, Polysiphonia Gracilis, Protokuetzingia Australasica, Spirocladia Barodensis, Tolypiocladia Glomerulata, Amphiroa Anceps, Amphiroa Foliacea, Amphiroa Gracilis, Haliptilon Roseum, Hydrolithon Farinosum, Hydrolithon Onkodes, Jania Pulchella, Lithophyllum Bermudense, Mesophyllum Engelhartii, Mesophyllum Erubescens, Mesophyllum Funafutiense, Metagoniolithon Radiatum, Metagoniolithon Stelliferum, Metamastophora Flabellata, Pneophyllum Fragile, Gelidium Austral, Pterocladia Lucida, Gelidiella Pannosa, Amphiplexia Hymenocladioides, Claviclonium Ovatum, Hennedya Crispa, Areschougia Ligulata, Callophycus Serratus, Callophycus Oppositifolius, Erythroclonium Sonderi, Eucheuma Denticulatum, Eucheuma Gelatinum, Eucheuma Speciosum, Meristotheca Papulosa, Solieria Robusta, Craspedocarpus Venosus, Dicranema Revolutum, Tylotus Obtusatus, Acrosymphyton Taylorii, Dudresnaya Capricornica, Rhodopeltis Borealis, Hypnea Spinella, Hypnea Valentiae, Stylonema Alsidii, Audouinella Saviana, Asparagopsis Armata, Asparagopsis Taxiformis, Acrothamnion Preissii, Aglaothamnion Cordatum, Anotrichium Tenue, Antithamnion Antillanum, Antithamnion Armatum, Antithamnion Hanovioides, Carpothamnion Gunnianum, Centroceras Clavulatum, Ceramium Filicula, Ceramium Flaccidum, Ceramium Isogonum, Ceramium Macilentum, Ceramium Mazatlanense, Ceramium Puberulum, Ceramium Sherpherdii, Ceramium Sympodiale, Corallophila Huysmansii, Dasyphila Preissii, Drewiana Nitella, Euptilocladia Spongiosa, Euptilota Articulata, Gattya Pinnella, Griffithsia Ovalis, Guiryella Repens, Haloplegma Preissii, Lejolisia Aegagropila, Monosporus Indicus, Perischelia Glomulifera, Pleonosporium Caribaeum, Seirospora Orientalis, Spyridia Filamentosa, Tanakaella Itonoi, Trithamnion Gracilissimum, Wrangelia Plumosa, Dasya Iyengarii, Dasya Pilosa, Acrosorium Decumbens, Claudea Elegans, Cottoniella Filamentosa, Haraldiophyllum Erosum, Hemineura Frondosa, Heterodoxia Denticulata, Hypoglossum Caloglossoides, Hypoglossum Revolutum, Martensia Australis, Martensia Fragilis, Platysiphonia Corymbosa, Platysiphonia Delicata, Platysiphonia Marginalis, Sarcomenia Delesserioides, Acanthophora Dendroides, Acanthophora Spicifera, Chondria Curdieana, Chondria Dangeardii, Chondria Lanceolata, Dasyclonium Flaccidum, Dasyclonium Incisum, Dictyomenia Sonderi, Dictyomenia Tridens, Ditria Expleta, Doxodasya Bolbochaete, Endosiphonia Spinuligera, Rhodymenia Leptophylla, Rhodymenia Sonderi, Webervanboassea Splachnoides, Glaphrymenia Pustulosa, Kallymenia Cribrogloea, Kallymenia Cribrosa, Nemastoma Damaecornis, Predaea Laciniosa, Predaea Weldii, Titanophora Weberae, Nizymania Conferta, Peyssonnelia Capensis, Peyssonnelia Inamoena, Phacelocarpus Alatus, Portieria Hornemannii, Curdiea Obesa, Gracilaria Canaliculata, Gracilaria Preissiana, Gracilaria Textorii, Codiophyllum Flabelliforme, Erythrocladia Irregularis, Cryptonemia Kallymenioides, Epiphloea Bullosa, Gelinaria Ulvoidea, Halymenia Floresia, Sebdenia Flabellata, Porphyra Crispate Kjellman, Gracilaria Corticata, Gracilaria Foliifera, Gracilaria Verrucosa, Grateloupia Filicina, Grateloupia Filicina F. Horrida, Grateloupia Lithophila, Peyssonnelia Obscura, Hildenbrandia Rubra, Amphiroa Anceps, Amphiroa Fragilissima, Amphiroa Rigida, Cheilosporum Spectabile, Corallina Officinalis, Hydrolithon Farinosum, Hydrolithon Reinboldii, Jania Rubens, Lithophyllum Orbiculatum, Catenella Caespitose, Chondracanthus Acicularis, Hypnea Flagelliformis, Hypnea Musciformis, Hypnea Spinella, Hypnea Valentiae, Ahnfeltiopsis Pygmaea, Champia Compressa, Champia Parvula, Gastroclonium Compressum, Gelidiopsis Variabilis, Antithamnion Cruciatum, Ceramium Cimbricum, Ceramium Cruciatum, Gayliellaflaccida, Aglaothamnion Tenuissimum, Crouania Attenuata, Ptilothamnion Speluncarum, Wrangelia Argus, Dasya Ocellata, Caloglossa Leprieurii, Aloglossa Ogasawaraensis, Erythroglossum Lusitanicum, Hypoglossum Hypoglossoides, Acanthophora Muscoides, Bostrychia Radicans, Bostrychia Tenella, Chondria Armata, Chondria Capillaries, Herposiphonia Secunda, Laurencia Obtuse, Neosiphonia Ferulacea, Polysiphonia Atlantica, Polysiphonia Denudate, Vaucheria Longicaulis, Feldmannia Indica, Feldmannia Irregularis, Hinksia Mitchelliae, Ralfsia Verrucosa, Sphacelaria Rigidula, Canistrocarpus Cervicornis, Canistrocarpus Crispatus, Canistrocarpus Magneanus, Dictyopteris Australis, Dictyota Bartayresiana, Dictyota Ceylanica, Dictyota Ciliolate, Dictyota Dichotoma, Dictyota Divaricata, Dictyota Dumosa, Padina Antillarum, Padina Australis, Padina Boryana, Padina Gymnospora, Padina Pavonica, Spatoglossum Asperum, Spatoglossum Variabile, Stoechospermum Polypodioides, Chnoospora Minima, Colpomenia Sinuosa, Iyengaria Stellata, Rosenvingea Orientalis, Sargassum Cinctum, Sargassum Cinereum, Sargassum Crassifolium, Sargassum Glaucescens, Sargassum Ilicifolium, Sargassum Plagiophyllum, Sargassum Polycystum, Sargassum Prismaticum, Sargassum Swartzii, Sargassum Tenerrimum, Sargassum Vulgare, Gayralia Oxysperma, Ulva Clathrata, Ulva Compressa, Ulva Conglobata, Ulva Flexuosa, Ulva Intestinalis, Ulva Rigida, Ulva Taeniata, Chaetomorpha Antennina, Chaetomorpha Linum, Chaetomorpha Spiralis, Cladophora Bombayensis, Cladophora Coelothrix, Cladophora Glomerata, Cladophora Lehmanniana, Cladophora Prehendens, Cladophora Prolifera, Cladophora Rhizoclonioidea, Cladophora Saracenica, Cladophora Socialis, Cladophora Vagabunda, Rhizoclonium Tortuosum, Boodlea Composite, Cladophoropsis Sundanensis, Phyllodictyon Anastomosans, Valoniopsis Pachynema, Bryopis Hypnoides, Bryopsis Pennata, Bryopsis Plumose, Caulerpa Peltata, Caulerpa Racemosa, Caulerpa Scalpelliformis, Caulerpa Sertularioides, Caulerpa Verticillata, Avrainvillea Erecta, Chlorodesmis Hildebrandtii, Dotyophycus Abbottiae, Ganonema Farinosa, Gloiotrichus Fractalis, Liagora Setchellii, Trichogloea Requienii, Yamadaella, Galaxaura Marginata, Galaxaura Obtusata, Galaxaura Rugosa, Scinaia Tsinglanensis, Tricleocarpa Cylindrica, Plocamium Preissianum, Champia Compressa, Champia Pravula, Champia Zostericola, Lomentaria Corallicola, Lomentaria Monochlamydea, Semnocarpoa Minuta, Caulerpa Webbiana, Caulerpa Racemosa Var. Turbinata Neorhodomela Oregona, Odonthalia Floccose, Odonthalia Floccosa, Forma Comosa, Odonthalia Washingtoniensis, Ecklonia Kurome, Mastocarpus Jardinii, Acetabularia Calyculus, Halimeda Cuneata, Porphyra Suborbiculata, Porphyra Vietnamensis, Cladophoropsis Herpestica, Siphonocladus Tropicus, Struvea Plumosa, Rhodella Maculate, Polysiphonia Hendryi, Ecklonia Stoloifera, Microcladia Borealis, Microdictyon Umbilicatum, Ecklonia Maxima, Ecklonia Radiate, Nereocystis Luetkeana, Penicillus Nodulosus, Ecklonia Bicyclis Ecklonia Arborea, Eisenia Bicyclis, Eisenia Arboraea, Halosaccion Glandiforme, Amphora Coffeiformis Var. Tenuis, Dictyosphaeria Cavernosa, Dictyopteris Muelleri, Dictyopteris Plagiogramma, Dictyota Ciliolata, Dictyota Dichotoma, Dictyota Dichotoma Var Intricata, Dictyota Furcellata, Dictyota Mertensii, Dictyota Naevosa, Dilophus Crinitus, Dilophus Fastigiatus, Dilophus Robustus, Distromium Flabellatum, Lobophora Variegata, Pachydictyon Paniculatum, Sargassum Boryi, Sargassum Decurrens, Sargassum Distichum, Sargassum Fallax, Sargassum Ligulatum, Sargassum Linearifolium, Sargassum Podacanthum, Sargassum Spinuligerum, Sargassum Tristichum, Padina Boergesenii, Padina Elegans, Padina Sanctae-Crucis, Padina Tenuis, Stypopodium Australasicum, Stypopodium Flabelliforme, Zonaria Turneriana, Hincksia Mitchelliae, Caulocystis Uvifera, Cystoseira Trinodis, Hormophysa Cuneiformis, Myriodesma Quercifolium, Scaberia Agardhii, Ecklonia Radiata, Hydroclathrus Clathratus, Sphacelaria Biradiata, Sphacelaria Novae-Hollandiae, Sphacelaria Rigidula, Austronereia Australis, Encyothalia Cliftonii, Sporochnus Comosus, Dictyosphaeria Versluysii, Amphora Delicatissima, Amphora Delicatissima Var. Capitata, Cosmocladium Perissum, Anadyomene Brownie, Anftistrodesmus, Ammsirodesnms Falcatus, Dilsea Californica, Gigartina Agardhii, Delesseria Decipiens, Polyneura Latissima, Mastocarpus Papillatus, Cryptosiphonia Woodii, Porphyra Pseudolanceolata, Melobesia Mediocris, Boekelovia Hooglandii, Codium Duthieae, Codium Geppiorum, Codium Laminarioides, Codium Lucasii, Codium Spongiosum, Plocamium Cartilagineum, Farlowia Mollis, Hypnea Musciformis, Meristotheca Senegalensis, Sparlingia Pertussa, Meristotheca Papulosa, Halydris Siliquosa, Rhodymenia Pertussa, Botryococcus Brmmii, Botryococcus Sudeticus, Erythrophyllum Delesserioides, Gigartina Papillata, Bracteococcus Minor, Egregia Menziesii, Laminaria Sinclairii, Bracteococcus Medionucleats, Lessoniopsis Littoralis, Chaetoceros Gracilis, Ectocarpus Sp., Valonia Macrophysa, Gloiopeltis Furcata, Constantinea Simplex, Colpomenia Bullosa, Ahnfeltiopsis Linearis, Colpomenia Peregrine, Endocladia Muricata, Callithamnion Pikeanum, Choetoceros Muejleri, Calliarthron Tuberculosum, Choetoceros Mueeri Var. Subsalsum, Chlamydomas Perigratmlata, Chlorella Anitrata, Chlorella Antarctica, Chlamydomonas Rheinhardii, Neochloris Oleoabundans, Emiliana Huxleyi, Chlamydomonas Sajao, Gigartina Exasperate, Chondracanthus Exasperates, Chlamydomonas Moewusii, Candida, Chlorella Capsulate, Nanococcus Vulgaris, Pelvetiopsis Limitata, Chlorella Desiccate, Chlorella Ellipsoidea, Postelsia Palmaeformis, Chlorelia Etmrsonii, Sargassum Muticum, Chlorell Fusco, Eklonia Maxima, Chlorella Fusca Var. Vacuolate, Ceramium Rubrum, Chlorella Glucolropha, Leathesia Marina, Chlorella Infiisionum, Analipus Japonicas, Chlorella Infimon M Var. Actophija, Desmodesmus Asymmetricus, Chlorella Infustomtm Var. Attxenophila, Chlorella Kessleri, Chlorella Lobaphord, Chlorella Luieoviridis, Chlorella Luieoviridis Var. Aureovmdts, Ralfsia Fungiformis, Ceramium Codicola, Chlorella Hiteavmdis Var, Hitescens, Chlorella Riniata, Chlorella Minttssima, Chlorella Mutabilis, Chlorella Nocturna, Chlorella Ovalis, Costaria Costata, Desmarestia Ligulata, Fucus Vesiculosus, Fucus Serratus, Chlorella Parva, Chlorella Pyrenoidosa, Chlorella Phoiophila, Chlorella Pringsheimii, Chlorella Prototheecoides, Chlorella Protat Ecoides Var. Acidicola, Chlorella Regularis, Prionitis Sternbergii, Chlorella Regularis Var. Minima, Chlorella Regularis Var. Umbricata, Chlorella Reisiglii, Chlorella Saecharophila, Chlorella Saecharophila Var. Ellipsoidea, Chlorella Salina, Chlorella Simplex, Chlorell Sorokmiana, Chlorella Sphaerica, Chlorella Stigmatophora, Chlorella Var Iellii, Chlorella Vulgaris, Codium Setchellii, Corallina Vancouveriensis, Chlorella Vulgaris Fo. Tertia, Chlorella Vulgaris Var. Autotroph Ica, Chlorella Vulgaris Var. Viridis, Chlorella Vulgaris Var. Vulgaris, Chlorella Vulgaris Var Vulgaris Fo. Tertia, Chlorella Vulgaris Var. Vulgaris Fo. Viridis, Chlorella Xamhella, Chlorella Zofingiensis, Chlorella Irebouxioides, Chlorococcum Infusiovum, Chlorogoni N, Crypthecodinium Cohnii, Cyclotella Cryptica, Cyclotejla Meneghiniana, Dimaliella Hardawil, Dunaliella Bioculata, Dimaliella Granulate, Dunaliella Maritime, Dunaliella Minuta, Dimaliella Parva, Dunaliella Peircei, Dunaliella Primolecta, Bossiella Plumose, Dunaliella Salina, Dimaliella Terricoia, Dunaliella Tertiolecta, Dunaliella Viridis, Dunaliella Tertioiecta, Eremosphaera Viridis, Euglena Gracilis, Fragilari Crotonensis, Haematococcus Pluvialis, Hochrysis Galbana, Nannochloropsis Salina, Navicida Accepiata, Navicula Pseudotenelloides, Porphyridium Cruentum, Porphyridium Parvum, Scenedesmus Dimorphus, Navicul Pellicidosa, Navicida Saprophtla, Odontella Aurita, Tschia Communis, Nitzschia Alexandrine, Nitzschia Clostenum, Nitzschia Communis, Nitzschia D Sipata, Nitzschia Frustuhmi, Nitzschia Hantzschiana, Nitzschia Inconspicua, Nitzschia Intermedia, Cladophora Columbiana, Nitzschia Microcephala, Nitzschia Pusilla, Isochrysis Galbana, Nitzschia Pusilla E Iptica, Nitzschia Pusilla Monoensis, Palmaria Mollis, Rhodymenia Palmata F. Mollis, Nitzschia Quadrangular, Oocystis Pusilla, Acrosiphonia Coalita, Pamchlorelta Kessleri, Pascheria Acidophila, Phaeodactyhan Tricomutwn, Pleurochrysis Camerae, Pleurochrysis Dentate, Pleurochrysis Carterae, Prototheca Wickerhamii, Prototheca Stagnora, Prototheca Ponoricensis, Prototheca Moriformis, Prototheca Zopfii, Pseudochlorella Aquatica, Rhodococcus Opaciis, Sarcinoid Chrysophyte, Scenedesmus Annatus, Scenedesmus Obliquus, Scenedesmus Quadricauda, Tagetes Erecta, Tetrasehnis Suecica, Codium Fragile, Thalassiosira Weissflogii, Viridiella Fridericiana, Palmaria Palmate, Alaria Esculenta, Saccharina Latissima, Saccharina Sessilis, Saccharina Dentigera, Laminaria Saccharina, Porphyra Umbilicalis, Alaria Marginata, Ulva Lactuca, Ulva Armoricana, Laminaria Digitata, Himanthalia Elongata, Ascophyllum Nodosum, Laminaria Longicruris, Scytosiphon Dotyi, Scytosiphon Lomentaria, Porphyra Yezoensis, Focus Vesiculosus, Kappaphycus Alvarezii, Betaphycus Gracilaria, Gelidium Pterocladia, Soranthera Ulvoidea, Chondrus Crispus, Mastocarpus Stellatus, Gracilaria Edulis, Phaeostrophion Irregulare, Enteromorpha Intestinalis, Enteromorpha Compressa, Macrocystis Pyrifera, Asparagopsis Armata, Mazzaella Flaccida Iridaea Flaccid, Mazzaella Oregona, Iridaea Oregona, Iridaea Heterocarpa, Mazzaella Parksii, Iridaea Cornucopiae, Mazzaella Splendens, Iridaea Cordata*, or mixtures thereof. However, those skilled in the art will appreciate that it is possible to utilize any other species known in the art, without departing from the scope of the invention. The algae are commercially manufactured and available through various companies.

According to yet another embodiment, algae is any one of *Spirulina, Arthrospira, Chlorella, Anabaena, Sargassum, Scenedesmus, Aphanizomenon, Dunaliella, Phymatolithion, Lithothamnium, Ascophyllum, Enteromorpha, Tetraselmis, Prymnesium, Chlamydomonas, Euglena, Caulerpa, Padina, Urophora, Chondria, Caulerpa, Lyngby, Prasiola, Gymnopilus, Melanothamnus, Turbeneria, Mastigocladopsis, Hydroclathrus, Padina, Cystoseira, Laminaria, Fucus, Ulva* or their species and mixtures thereof. According to further embodiment, algae is *Spirulina Plantensis, Spirulina Maxima, Anabaena Cylindrica, Aphanizomenon Flos-Aquae, Enteromorpha Intestinalis, Enteromorpha Compressa, Scenedesmus Obliquus, Ascophyllum Nodosum, Phymatolithion calcereum, Lithothamnium calcereum, Aphanizomenon Flos-Aquae, Dunaliella Salina, Tetraselmis maculate, Prymnesium parvum, Chlamydomonas rheinhardii, Euglena gracilis, Caulerpa scalpelliformis, Padina pavonica, Sargassum tenerrimum, Urophora fasciata, Urophora lactuca, Sargassum wightii, Chondria armata, Caulerpa racemosa, Lyngby majuscule, Prasiola crispa, Gymnopilus edulis* or their species and mixtures thereof. However, those skilled in the art will appreciate that it is possible to utilize any other species of *Spirulina, Arthrospira, Chlorella, Anabaena, Sargassum, Scenedesmus, Aphanizomenon, Dunaliella, Phymatolithion, Lithothamnium, Ascophyllum, Enteromorpha, Tetraselmis, Prymnesium, Chlamydomonas, Euglena, Caulerpa, Padina, Urophora, Chondria, Caulerpa, Lyngby, Prasiola, Gymnopilus, Melanothamnus, Turbeneria, Mastigocladopsis, Hydroclathrus, Padina, Cystoseira, Laminaria, Fucus, Ulva* or different algaes known in the art, without departing from the scope of the invention. The algaes are commercially manufactured and available through various companies.

According to an embodiment, the algae is present in a concentration range of at least 0.1% by weight of the total composition. According to another embodiment, the algae is present in a concentration range of at least 1% by weight of the total composition. According to another embodiment, the algae is present in a concentration range of at least 5% by weight of the total composition. According to another embodiment, the algae is present in a concentration range of at least 10% by weight of the total composition. According to further embodiment, the algae is present in in a concentration range of at least 20% by weight of the total composition. According to further embodiment, the algae is present in a concentration range of at least 30% by weight of the total composition. According to further embodiment, the algae is present in a concentration range of at least 40% by weight of the total composition. According to further embodiment, the algae is present in a concentration range of at least 50% by weight of the total composition. According to further embodiment, the algae is present in a concentration range of at least 60% by weight of the total composition. According to further embodiment, the algae is present in a concentration range of at least 65% by weight of the total composition.

According to an embodiment, the agrochemically acceptable excipient includes one or more of surfactants, structuring agents, buffers or pH adjusters or neutralizing agents, antifoaming agents or defoamers, chelating or complexing or sesquitering agents, humectants, preservatives, UV absorbents, UV ray scattering agents, antifreezing agent or freeze point depressants, sticking agent, spreading agents, penetrants, pigments, colorants and stabilizers or derivatives, and mixtures thereof. However, those skilled in the art will appreciate that it is possible to utilize additional agrochemically acceptable excipients without departing from the scope of the present invention. The agrochemically acceptable excipients are commercially manufactured and available through various companies.

According to an embodiment, the agrochemical excipients are present in a concentration range of at least 99.9% by weight of the total composition. According to an embodiment, the agrochemical excipients are present in a concentration range of at least 99% by weight of the total composition. According to an embodiment, the agrochemical excipients are present in a concentration range of at least 95% by weight of the total composition. According to an embodiment, the agrochemical excipients are present in a concentration range of at least 90% by weight of the total composition. According to an embodiment, the agrochemical excipients are present in a concentration range of at least 80% by weight of the total composition. According to an embodiment, the agrochemical excipients are present in a concentration range of at least 70% by weight of the total composition. According to an embodiment, the agrochemical excipients are present in a concentration range of at least 60% by weight of the total composition. According to an embodiment, the agrochemical excipients are present in a concentration range of at least 50% by weight of the total composition. According to an embodiment, the agrochemical excipients are present in a concentration range of at least 40% by weight of the total composition. According to an embodiment, the agrochemical excipients are present in a concentration range of at least 30% by weight of the total composition. According to an embodiment, the agrochemical excipients are present in a concentration range of at least 20% by weight of the total composition. According to an embodiment, the agrochemical excipients are present in a concentration range of at least 10% by weight of the total composition. According to an embodiment, the agrochemical excipients are present in a concentration range of at least 5% by weight of the total composition.

According to an embodiment, the agrochemically acceptable excipient comprises one or more of surfactants and structuring agents.

According to another embodiment, the surfactants include one or more of emulsifiers, wetting agents and dispersing agents.

According to a further embodiment, the surfactants include one or more of ionic, anionic, cationic, non-ionic, amphoteric and polymeric surfactants.

The surfactant added adsorbs on a particle surface resulting in their colloidal stability. The particles need to be maintained stable over a long period of time since any strong aggregation in the system may cause various problem like aggregation of the particle, lack of dispersion on dilution. The surfactants help to lower the surface tension (or interfacial tension) between two liquids, between a gas and a liquid, or between a liquid and a solid.

The ionic surfactants include one or more of carboxylates, alkyl carboxylates, fatty acid salts, fluoro carboxylate, alkyl sulfates, alkyl ether sulfates, sulfonates, alkyl benzene sulfonates, alpha olefin sulphonates, aromatic hydrocarbon sulphonates, naphthalene sulfonate salts, fatty alcohol sulphates, mono-alkyl sulphosuccinates, alkyl sulphosuccinamates, naphthalene sulphonates, phosphate esters, alkyl aryl ether phosphates, alkyl ether phosphates, quaternary ammonium salts and quaternised amine ethoxylates.

The non-ionic surfactants include one or more of polyol esters, polyol fatty acid esters, polyethoxylated esters, polyethoxylated alcohols, ethoxylated and propoxylated fatty alcohols, ethoxylated and propoxylated short-chain alcohols, EO/PO copolymers, di, tri-block copolymers, block copolymers of polyethylene glycol and polypropylene glycol, poloxamers, polysorbates, alkyl polysaccharides such as alkyl polyglycosides and blends thereof, amine ethoxylates, sorbitan fatty acid ester, glycol and glycerol esters, glucosidyl alkyl ethers, sorbitan alkyl esters, polyoxyethylene glycol, sorbitan alkyl esters, sorbitan derivatives, and their ethoxylated derivatives (Tweens), and sucrose esters of fatty acids, polyethylene glycol, glyceryl laureate, lauryl glucoside, nonylphenolpolyethoxyethanols, nonyl phenol polyglycol ether, castor oil ethoxylate, polyglycol ethers, polyadducts of ethylene oxide and propylene oxide, block copolymer of polyalkylene glycol ether and hydroxystearic acid, ethylene oxide propylene oxide block copolymer, tributylphenoxypolyethoxy ethanol, octylphenoxypolyethoxy ethanol, etho-propoxylated tristyrlphenols, ethoxylated alcohols, polyoxy ethylene sorbitan, a sorbitan fatty acid ester, a glycerin fatty acid ester, a fatty acid polyglyceride, a fatty acid alcohol polyglycol ether, acetylene glycol, acetylene alcohol, an oxyalkylene block polymer, a polyoxyethylene alkyl ether, a polyoxyethylene alkylaryl ether, a polyoxyethylene styrylaryl ether, a polyoxyethylene glycol alkyl ether, polyethylene glycol, a polyoxyethylene fatty acid ester, a polyoxyethylene sorbitan fatty acid ester, a polyoxyethylene glycerin fatty acid ester, a polyoxyethylene hydrogenated castor oil or a polyoxypropylene fatty acid ester, or derivatives, and mixtures thereof. Amphoteric surfactants include one or more of betaine, imidazolines, alkyl amphoacetates and proprionates, alkyl Ampho(di)acetates, and diprionates, diprionates, lecithin and ethanolamine fatty amides, or salts, derivatives therof.

The anionic surfactants include one or more of, but not limited to a salt of fatty acid, a benzoate, a polycarboxylate, a salt of alkylsulfuric acid ester, an alkyl sulfate, an alkylaryl sulfate, an alkyl diglycol ether sulfate, a salt of alcohol sulfuric acid ester, an alkyl sulfonate, an alkylaryl sulfonate, an aryl sulfonate, a lignin sulfonate, an alkyldiphenylether disulfonate, a polystyrene sulfonate, a salt of alkylphosphoric acid ester, an alkylaryl phosphate, a styrylaryl phosphate, a salt of polyoxyethylene alkyl ether sulfuric acid ester, a polyoxyethylene alkylaryl ether sulfate, a salt of polyoxyethylene alkylaryl ether sulfuric acid ester, a polyoxyethylene alkyl ether phosphate, a salt of polyoxyethylene alkylaryl phosphoric acid ester, a salt of polyoxyethylene aryl ether phosphoric acid ester, a naphthalene sulfonic acid condensed with formaldehyde or a salt of alkylnaphthalene sulfonic acid condensed with formaldehyde and mixtures thereof.

The surfactants include carbohydrates such as modified starches, Cellulose, hemicellulose, hydrocolloids; celluloses such as carboxymethyl cellulose, hydroxyethyl cellulose, hydroxy-methylethyl cellulose, hydroxyethylpropyl cellulose, methyl hydroxyethyl cellulose, methyl cellulose; other carbohydrates such as xanthan gum, gluten, alginic acid, phycocolloids, chitin, gum arabic, guar gum, gum karaya, gum tragacanth and locust bean gum; synthetic organic polymers such as polyacrylates, polyvinyl pyrrolidone, polyalkyl pyrrolidone, polyvinyl alcohol, polyvinylmethyl ether, polyvinyl acrylates, poly(vinyl acetate), polyethoxylated fatty acids; Protein such as simple proteins, conjugated proteins or derived proteins, water soluble proteins, methacrylate copolymer, polyaminocarboxylic acid chelate compound, sulfonated styrene-isobutylene-maleic anhydride copolymer, salts of polyacrylates of methacrylates, starch-polyacrylonitrile graft copolymer, acidic proteins, basic proteins, water insoluble proteins, or derivatives thereof. According to further embodiment, the suitable protein include one or more of Albumin; Histone; Protamine; Prolamine; Glutelin; albuminoids, Phosphoprotein; Nucleoprotein; mucoprotein; Glycoprotein such as Mucin; soy extract, ovalbumin; metal stearates, or salts, derivatives and mixtures thereof.

Surfactants that are commercially available under the trademark but are not limited to Atlas G5000, Tersperse® 2500, Zephrym™ PD 7000, Soluplus®, METHOCEL™, TERMUL 5429, TERMUL 2510, ECOTERIC®, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80, Span20, 40, 60, 80, 83, 85, 120, Brij®, Triton™ Atlox 4912, Atlas G5000, TERMUL 3512, TERMUL 3015, TERMUL 5429, TERMUL 2510, ECOTERIC®, ECOTERIC® T85, ECOTERIC® T20, TERIC 12A4, EULSOGEN® 118, Genapol®X, Genapol®OX-080, Genapol® C 100, Emulsogen® EL 200, Arlacel P135, Hypermer 8261, Hypermer B239, Hypermer B261, Hypermer B246sf, Solutol HS 15, Promulgen™ D, Soprophor 7961P, Soprophor TSP/461, Soprophor TSP/724, Croduret 40, Etocas 200, Etocas 29, Rokacet R26, CHEMONIC OE-20, Triton™ N-101, Tween 20, 40, 60, 65, 80 and Span 20, 40, 60, 80, 83, 85, 120 also be used.

According to an embodiment, the surfactant is present in an amount of 0.1% to 50% w/w of the composition. According to a further embodiment, the surfactant is present in an amount of 0.1% to 40% w/w of the composition. According to a further embodiment, the surfactant is present in an amount of 0.1% to 30% w/w of the composition. According to a further embodiment, the surfactant is present in an amount of 0.1% to 20% w/w of the composition. According to a further embodiment, the surfactant is present in an amount of 0.1% to 10% w/w of the composition. According to a further embodiment, the surfactant is present in an amount of 0.1% to 5% w/w of the composition.

According to an embodiment, when the composition comprises less than 35% by weight of the total composition of algae, the ratio of the total weight of algae to the total weight of the surfactant is in the range of from 100:1 to 1:50. According to further embodiment, the ratio of the algae to the surfactant is 90:1 to 1:50. According to further embodiment, the ratio of the algae to the surfactant is 80:1 to 1:50. According to further embodiment, the ratio of the algae to the surfactant is 70:1 to 1:50. According to further embodiment, the ratio of the algae to the surfactant is 60:1 to 1:50. According to further embodiment, the ratio of the algae to the surfactant is 50:1 to 1:50. According to further embodiment, the ratio of the algae to the surfactant is 40:1 to 1:50. According to further embodiment, the ratio of the algae to the surfactant is 30:1 to 1:50. According to further embodiment, the ratio of the algae to the surfactant is 20:1 to 1:50. According to further embodiment, the ratio of the algae to the surfactant is 10:1 to 1:50. According to further embodiment, the ratio of the algae to the surfactant is 1:1 to 1:50. According to further embodiment, the ratio of the algae to the surfactant is 100:1 to 1:40. According to further embodiment, the ratio of the algae to the surfactant is 100:1 to 1:30. According to further embodiment, the ratio of the algae to the surfactant is 100:1 to 1:20. According to further embodiment, the ratio of the algae to the surfactant is 100:1 to 1:10. According to further embodiment, the ratio of the algae to the surfactant is 100:1 to 1:1.

According to an embodiment, when the composition comprises more than 35% but up to 65% by weight of the total composition of algae, the ratio of total weight of algae to the total weight of the surfactant is in the range of from 50:1 to 1:30. According to further embodiment, the ratio of the algae to the surfactant is 40:1 to 1:30. According to further embodiment, the ratio of the algae to the surfactant is 30:1 to 1:30. According to further embodiment, the ratio of the algae to the surfactant is 20:1 to 1:30. According to further embodiment, the ratio of the algae to the surfactant is 10:1 to 1:30. According to further embodiment, the ratio of the algae to the surfactant is 1:1 to 1:30. According to further embodiment, the ratio of the algae to the surfactant is 50:1 to 1:20. According to further embodiment, the ratio of the algae to the surfactant is 50:1 to 1:10. According to further embodiment, the ratio of the algae to the surfactant is 50:1 to 1:1.

However, the ratios stated herein are only exemplary and those skilled in the art will appreciate that it is possible to utilize different ratios without departing from the scope of the present invention.

According to an embodiment, the structuring agent includes one or more of thickeners, viscosity modifiers, tackifiers, suspension aids, rheology modifiers or anti-settling agents. A structuring agent prevents sedimentation of the active ingredient particles after prolonged storage.

According to an embodiment, the structuring agents which are used in the aqeuous suspension composition include, but not limited to one or more polymers such as polyacrylics, polyacrylamides, polysaccharides, hydrophobically modified cellulose derivatives, co-polymers of cellulose derivatives, carboxyvinyl or polyvinyl pyrrolidones, polyethylenes, polyvinyl alcohol and derivatives; clays such as bentonite clays, kaolin, smectite, attapulgites, attaclays with high surface area silica and natural gums such as guar gum, xanthan gum, gum Arabic, gum tragacanth, rhamsan gum, locust bean gum, carageenan, welan gum, veegum, gelatin, dextrin, collagen; polyacrylic acids and their sodium salts; the polyglycol ethers of fatty alcohols and polyethylene oxide or polypropylene oxide condensation products and mixtures thereof and include ethoxylated alkyl phenols (also designated in the art as alkylaryl polyether alcohols); ethoxylated aliphatic alcohols (or alkyl polyether alcohols); ethoxylated fatty acids (or polyoxyethylene fatty acid esters); ethoxylated anhydrosorbitol esters (or polyethylene sorbitan fatty acid esters), long chain amine and cyclic amine oxides which are nonionic in basic solutions; long chain tertiary phosphine oxides; and long chain dialkyl sulfoxides, fumed silica, mixture of fumed silica and fumed aluminium oxide, swellable polymers, polyamides or its derivatives; polyols such as glycerine; poly(vinylpyrrolidone), poly(vinyl alcohol), poly(vinyl acetate), sodium polyacrylate, poly(ethylene glycol), polyethylene oxide, phospholipid (for example, cephalin, and the like); stachyose, fructo-oligosaccharides, amylose, pectins, alginates, hydrocolloids and mixtures thereof. Also, celluloses such as hemicellulose, carboxymethylcellulose, ethylcellulose, hydroxyethylcellulose, hydroxy-methyl ethyl cellulose, hydroxyl ethyl propyl cellulose, methylhydroxyethylcellulose, methylcellulose; starches such, starch acetates, starch hydroxyethyl ethers, ionic starches, long-chain alkyl starches, dextrins, maltodextrin, corn starch, amine starches, phosphates starches, and dialdehyde starches; plant starches such as corn starch and potato starch; other carbohydrates such as pectin, dextrin, amylopectin, xylan, glycogen, agar, gluten, alginic acid, phycocolloids, chitin, or derivatives thereof. However, those skilled in the art will appreciate that it is possible to utilize different thickeners without departing from the scope of the present invention. Preferred structuring agents include one or more of xanthan gum, aluminum silicate, methylcellulose, polysaccharide, alkaline earth metal silicate, gelatin, and polyvinyl alcohol. The structuring agents are commercially manufactured and available through various companies.

According to an embodiment, the structuring agents are present in the amount of 0.01% to 5% w/w of the composition. According to an embodiment, the structuring agents are present in the amount of 0.01% to 4% w/w of the composition. According to an embodiment, the structuring agents are present in the amount of 0.01% to 3% w/w of the composition. According to an embodiment, the structuring agents are present in the amount of 0.01% to 2% w/w of the composition. According to an embodiment, the structuring agents are present in the amount of 0.01% to 1% w/w of the composition. According to an embodiment, the structuring agents are present in the amount of 0.01% to 0.1% w/w of the composition.

According to an embodiment, the antifreezing agents or freezing point depressants which are used in the aqeuous suspension composition can include, but are not limited to one or more of polyhydric alcohols such as ethylene glycol, diethylene glycol, dipropylene glycol, propylene glycol, butyrolactone, N,N-dimethyl-formamide, glycerol, monohydric or polyhydric alcohols, glycerine, glycol ethers, glycol ethers, glycol monoethers such as the methyl, ethyl, propyl and butyl ether of ethylene glycol, diethylene glycol, propylene glycol and dipropylene glycol, glycol diethers such as methyl and ethyl diethers of ethylene glycol, diethylene glycol and dipropylene glycol, or urea, especially calcium chloride, glycerol, isopropanol, propylene glycol monomethyl ether, di- or tripropylene glycol monomethyl ether or cyclohexanol, carbohydrates such as glucose, mannose, fructose, galactose, sucrose, lactose, maltose, xylose, arabinose, sorbitol, mannitol, trehalose, raffinose or derivatives thereof. However, those skilled in the art will appreciate that it is possible to utilize different antifreezing agents without departing from the scope of the present invention. The antifreezing agents are commercially manufactured and available through various companies.

According to an embodiment, the antifoaming agents or defoamers which are used in the aqeuous suspension composition include, but are not limited to one or more of silica, siloxane, silicone dioxide, polydimethyl siloxane, alkyl polyacrylates, ethylene oxide/propylene oxide copolymers, polyethylene glycol, Silicone oils and magnesium stearate or derivatives thereof. Preferred antifoaming agents include silicone emulsions (such as, e.g., Silikon® SRE, Wacker or Rhodorsil® from Rhodia), long-chain alcohols, fatty acids, fluoroorganic compounds. However, those skilled in the art will appreciate that it is possible to utilize different antifoaming agents without departing from the scope of the present invention. The antifoaming agents are commercially manufactured and available through various companies. According to an embodiment, the anti-foaming agent is present in an amount of 0.01% to 10% w/w of the total composition. According to an embodiment, the anti-foaming agent is present in an amount of 0.01% to 5% w/w of the total composition. According to an embodiment, the antifoaming agent is present in an amount of 0.01% to 1% w/w of the total composition.

According to an embodiment, the chelating or complexing or sesquitering agents which are used in the aqeuous suspension composition include, but not limited to one or more of polycarboxylic acids such as polyacrylic acid and the various hydrolyzed poly(methyl vinyl ether/maleic anhydride); aminopolycarboxylic acids, such as N-hydroxyethyliminodiacetic acid, nitrilotriacetic acid (NTA), N,N,N',N'-ethylenediaminetetraacetic acid, N-hydroxyethyl-N,N',N'-ethylenediaminetriacetic acid and N,N,N',N'',N''-diethylenetriaminepentaacetic acid; α-hydroxy acids, such as citric acid, tartaric acid and gluconic acid; orthophosphates, such as trisodium phosphate, disodium phosphate, monosodium phosphate; condensed phosphates, such as sodium tripolyphosphate, tetrasodium pyrophosphate, sodium hexametaphosphate and sodium tetrapolyphosphate; 5-sulfo-8-hydroxyquinoline; and 3,5-disulfopyrocatechol, amino polycarboxylates, ethylene diamine tetraacetic acid (EDTA), diethylenetriamine pentaacetic acid (DTPA), N-hydroxyethyl-ethylenediamine-triacetic acid (HEDTA), ethylenediaminediacetate (EDDA), ethylenediamindi(o-hydroxyphenylacetic) acid (EDDHA), cyclohexane diamine tetraacetic acid (CDTA), polyethyleneaminepolyacetic acids, lignosulfonate, Ca—, K—, Na—, and ammonium lignosulfonates, fulvic acid, ulmic acid, amino acids, nucleic acids, cyclodextrin, humic acid, pyrophosphate, chelating resins such as amino or imino di-acetic acid and the like or derivatives thereof. However, those skilled in the art will appreciate that it is possible to utilize other chelating or complexing or sesquitering agents without departing from the scope of the present invention. The chelating or complexing or sesquitering agents are commercially manufactured and available through various companies.

According to an embodiment, the penetrants which are used in the aqeuous suspension composition include, but not limited to one or more of alcohol, glycol, glycol ether, ester, amine, alkanolamine, amine oxide, quaternary ammonium compound, triglyceride, fatty acid ester, fatty acid ether, N-methyl pyrrolidone, dimethylformamide, dimethylacetamide, or dimethyl sulfoxide, polyoxyethylene trimethylolpropane monooleate, polyoxyethylene trimethylolpropane dioleate, polyoxyethylene trimethylolpropane trioleate, polyoxyethylene sorbitan monooleate, polyoxyethylene sorbitol hexaoleate. However, those skilled in the art will appreciate that it is possible to utilize different penetrants without departing from the scope of the present invention. The penetrants are commercially manufactured and available through various companies.

According to an embodiment, the pH-adjusters or buffers or neutralizing agents which are used in the aqeuous suspension composition include both acids and bases of the organic or inorganic type and mixtures thereof. According to a further embodiment, pH-adjusters or buffers or neutralizing agents include, but not limited to organic acids, inorganic acids and alkali metal compounds or salts, derivatives thereof. According to an embodiment, the organic acids include, but are not limited to one or more of citric, malic, adipic, cinnamic, fumaric, maleic, succinic, and tartaric acid, or salts, derivatives thereof; and the mono-, di-, or tribasic salts of these acids or derivatives thereof. Suitable salts of these acids are the soluble or meltable salts and include those salts in which one or more acidic protons are replaced with a cation such as sodium, potassium, calcium, magnesium, and ammonium and mixtures thereof. Alkali metal compounds include hydroxides of alkali metals such as sodium hydroxide and potassium hydroxide, carbonates of alkali metals such as sodium carbonate, magnesium carbonates and potassium carbonate, hydrogencarbonates of alkali metals such as sodium hydrogencarbonate and alkali metal phosphates such as sodium phosphate and mixtures thereof. According to an embodiment, the salts of inorganic acids include, but not limited to one or more of alkali metal salts such as lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate and the like; alkaline earth metal salts such as magnesium chloride, calcium chloride, magnesium nitrate, calcium nitrate, magnesium sulfate and the like; and ammonium salts such as ammonium chloride, ammonium sulfate, ammonium monohydrogen phosphate, ammonium dihydrogen phosphate and the like. Preferred salts for use in this invention include sodium chloride, potassium chloride, calcium chloride and magnesium sulfate. Mixtures are also used to create pH-adjusters or buffers or neutralizing agents. However, those skilled in the art will appreciate that it is possible to utilize different pH-adjusters or buffers or neutralizing agents without departing from the scope of the present invention. The pH-adjusters or buffers or neutralizing agents are commercially manufactured and available through various companies. According to an embodiment, the pH-adjusters or buffers are present in an amount of 0.01% to 10% w/w. According to an embodiment, pH-adjusters or buffers are present in the amount of 0.01% to 5% w/w of the total composition. According to an embodiment, the pH-adjusters or buffers are present in the amount of 0.01% to 1% w/w of the total composition.

According to an embodiment, the spreading agents which are used in the aqeuous suspension composition include, but are not limited to one or more of cellulose powder, dextrin, modified starch, a polyaminocarboxylic acid chelate compound, crosslinked poly(vinylpyrrolidone), a copolymer of maleic acid with a styrene compound, a (meth)acrylic acid copolymer, a half ester of a polymer consisting of polyhydric alcohol with dicarboxylic anhydride, a water-soluble salt of polystyrenesulfonic acid, aliphatic alcohols, polyglycol, polyethers, clatharates or salts or derivatives therof. However, those skilled in the art will appreciate that it is possible to utilize different spreading agents without departing from the scope of the present invention. The spreading agents are commercially manufactured and available through various companies. According to an embodiment, the spreading agent is present in an amount of 0.1% to 20% w/w. According to an embodiment, the spreading agent is present in an amount of 0.1% to 10% w/w. According to an embodiment, the spreading agent is present in an amount of 0.1% to 5% w/w of the total composition. According to an embodiment, the spreading agent is present in an amount of 0.1% to 1% w/w of the total composition.

According to an embodiment, the sticking agents which are used in the aqeuous suspension composition include, but not limited to one or more of paraffin, terpene, a polyamide resin, polyacrylate, polyoxyethylene, wax, polyvinyl alkyl ether, an alkylphenol-formalin condensate, fatty acids, latex, aliphatic alcohols, vegetable oils such as cottonseed, or inorganic oils, petroleum distillates, modified trisiloxanes, polyglycol, polyethers, clatharates, a synthetic resin emulsion or salts or derivatives therof. However, those skilled in the art will appreciate that it is possible to utilize different sticking agents without departing from the scope of the present invention. The sticking agents are commercially manufactured and available through various companies. According to an embodiment, the sticking agent can be present in an amount of 0.1% to 30% w/w of the total composition. According to an embodiment, the sticking agent is present in an amount of 0.1% to 20% w/w of the total composition. According to an embodiment, the sticking agent is present in an amount of 0.1% to 10% w/w of the total composition.

According to an embodiment, the stabilizers which are used in the aqeuous suspension composition include, but not limited to one or more of peroxide compounds such as hydrogen peroxide and organic peroxides, alkyl nitrites such as ethyl nitrite and alkyl glyoxylates such as ethyl glyoxylate, zeolite, calcined lime and magnesium oxide; antioxidants such as phenol compounds, amine compounds, sulfur compounds, phosphoric acid compounds and the like; ultraviolet absorbers such as salicylic acid compounds, benzophenone compounds or derivatives thereof; alkaline earth and transition metal sulfates such as magnesium, zinc, aluminum and iron, sodium hexametaphosphate, lithium, sodium and potassium phosphates, sodium pyrophosphate, calcium chloride, oxide and boric anhydride or derivatives thereof. However, those skilled in the art will appreciate that it is possible to utilize different stabilizers without departing from the scope of the present invention. The stabilizers are commercially manufactured and available through various companies. According to an embodiment, the stabilizer is present in an amount of 0.1% to 30% w/w of the total composition. According to an embodiment, the stabilizer is present in an amount of 0.1% to 20% w/w of the total composition. According to an embodiment, the stabilizer is present in an amount of 0.1% to 10% w/w of the total composition.

According to an embodiment, the preservatives include but not limited to one or more of anti-fungal agents, biocides, anti-microbial agents, and antioxidant. Non limiting examples of preservatives include one or more of benzoic acid, its esters and salts; para-hydroxybenzoic acid (paraben), its esters and salts; propionic acid and its salts; salicylic acid and its salts; 2,4-hexadi enoic acid (sorbic acid) and its salt; formaldehyde and paraformaldehyde; 2-hydroxybiphenyl ether and its salts; 2-zincsulfidopyridine N-oxide; inorganic sulfites and bisulfites; sodium iodate, chlorobutanol; dehydraacetic acid; formic acid; 1,6-bis(4-amidino-2-bromophenoxy)-n-hexane and its salts; 10-undecylenic acid and its salts; 5-amino-1,3-bis(2-ethylhexyl)-5-methylhexahydropyrimidine, 5-bromo-5-nitro-1,3-dioxane, 2-bromo-2-nitropropane-1,3-diol, 2,4-dichlorobenzyl alcohol, N-(4-chlorophenyl)-N'-(3,4-dichlorophenyl)urea, 4-chloro-m-cresol, 2,4,4'-trichloro-2'-hydroxydiphenyl ether, 4-chloro-3,5-dimethylphenol, 1,1'-methylene-bis(3-(1-hydroxymethyl-2,4-dioximidazolidin-5-yl)urea), poly(hexamethylenediguanide) hydrochloride, 2-phenoxyethanol, hexamethylenetetramine, 1-(3-chloroallyl)-3,5,7-triaza-1-azonia-adamantane chloride, 1(4-chlorophenoxy)-1-(1H-imidazol-1-yl)-3,3-dimethyl-2-butanone, 1,3-bis(hydroxymethyl)-5,5-dimethyl-2,4-imidazolidinedione, benzyl alcohol, octopirox, 1,2-dibromo-2,4-dicyanobutane, 2,2'-methylenebis(6-bromo-4-chlorophenol), bromochlorophene, dichlorophene, 2-benzyl-4-chlorophenol, 2-chloroacetamide, chlorhexidine, chlorhexidine acetate, chlorhexidine gluconate, chlorhexidine hydrochloride, 1-phenoxypropan-2-ol, N-alkyl(C12-C22)trimethylammonium bromide and chloride, 4,4-dimethyl-1,3-oxazolidine, N-hydroxymethyl-N-(1,3-di(hydroxymethyl)-2,5-dioxoimidazolidin-4-yl)-N'-hydroxymethylurea, 1,6-bis(4-amidinophenoxy)-n-hexane and its salts, glutaraldehyde, 5-ethyl-1-aza-3,7-dioxabicyclo(3.3.0)octane, 3-(4-chlorophenoxy) propane-1,2-diol, Hyamine, alkyl(C8-C18) dimethylbenzylammonium chloride, alkyl(C8-C18) dimethylbenzylammonium bromide, alkyl(C8-C18) dimethylbenzylammonium saccharinate, benzyl hemiformal, 3-iodo-2-propynyl butylcarbamate, sodium hydroxymethylaminoacetate, cetyltrimethylammonium bromide, cetylpyridinium chloride, and derivatives of 2H isothiazol-3-one (so-called isothiazolone derivatives) such as alkylisothiazolones (for example 2-methyl-2H-isothiazol-3-one, MIT; chloro-2-methyl-2H-isothiazol-3-one, CIT), benzoisothiazolones (for example 1,2-benzoisothiazol-3(2H)-one, BIT, commercially available as Proxel® types from ICI) or 2-methyl-4,5-trimethylene-2H-isothiazol-3-one (MTIT), C1-C4-alkyl para-hydroxybenzoate, an dichlorophene, Butylhydroxytoluene, potassium sorbate, thimerosal, Sodium Propinoate, Sodium Benzoate, Propyl Paraben Sodium, Potassium Sorbate, Potassium Benzoate, Phenyl Mercuric Nitrate, Phenyl Ethyl Alcohol, Propyl Paraben, Phenol, Methyl Paraben Sodium, Ethylparaben, Methylparaben, Butylparaben, Chlorobutanol, Bezyla Alcohol, Benzothonium Chloride, Cetylpyridinium Chloride, Benzalkonium Chloride, 1,2-benzothiazol-3-one, Acticide® RS from Thor Chemie, Kathon® MK from Rohm & Haas, Preventol® (Lanxess®) and Proxel®, 3-bromo-2,3-diiodo-2-propenyl ethyl carbonate, 3-iodo-2-propynyl butyl carbamate, 2,3,3-triiodo allyl alcohol, and parachlorophenyl-3-iodopropargylformal; benzimidazole compounds and benzthiazole compounds such as 2-(4-thiazolyl)benzimidazole and 2-thiocyanomethylthiobenzo-thiazole; triazole compounds such as 1-(2-(2',4'-dichlorophenyl)-1,3-dioxolane-2-ylmethyl)-1H-1,2,4-triazole, 1-(2-(2',4'-dichlorophenyl)-4-propyl-1,3-dioxolane-2-ylmethyl)-1H-1,2,4-triazole, and α-(2-(4-chlorophenyl)ethyl)-α-(1,1-dimethylethyl)-1H-1,2,4-triazole-1-ethanol; and naturally occurring compounds such as 4-isopropyltropolone(hinokitiol), borax amino acids (e.g. glycine, histidine, tyrosine, tryptophan) and derivatives thereof, imidazole and imidazole derivatives (e.g. urocanic acid), peptides, such as, D,L-carnosine, D-carnosine, L-carnosine and derivatives thereof (e.g. anserine), 4,4'-thiobis-6-t-butyl-3-methylphenol, 2,6-di-t-butyl-p-cresol (BHT), and pentaerythrityl tetrakis[3-(3,5,-di-t-butyl-4-hydroxyphenyl)]propionate; amine antioxidants such as N,N'-di-2-naphthyl-p-phenylenediamine; hydroquinoline, 2,5-di(t-amyl)hydroquinoline; sulfur-containing antioxidants such as dilauryl thiodipropionate; and phosphorus-containing antioxidants such as triphenyl phosphate, and derivatives thereof, lipoic acid and derivatives thereof (e.g. dihydrolipoic acid), aurothioglucose, propylthiouracil and further thio compounds (e.g. thioglycerol, thiosorbitol, thioglycolic acid, thioredoxin, glutathione, cysteine, cystine, cystamine and the glycosyl, N-acetyl, methyl, ethyl, propyl, amyl, butyl, lauryl, palmitoyl, oleyl, γ-linoleyl, cholesteryl and glyceryl esters thereof), and salts thereof, dilauryl thiodipropionate, distearyl thiodipropion-ate, thiodipropionic acid and derivatives thereof (esters, ethers, peptides, lipids, nucleotides, nucleosides and salts), and sulfoximine compounds (e.g. buthionine sulfoximi-nes, homocysteine sulfoximine, buthionine sulfones, penta-, hexa-, heptathionine sul-foximine) in very low tolerated doses (e.g. pmol/kg to pmol/kg), also metal chelating agents (e.g. α-hydroxy fatty acids, EDTA, EGTA, phytic acid, lactoferrin), α-hydroxy acids (e.g. citric acid, lactic acid, malic acid), humic acids, bile acid, bile extracts, gallic esters (e.g. propyl, octyl and dodecyl gallate), flavonoids, catechins, bilirubin, biliverdin and derivatives thereof, unsaturated fatty acids and derivatives thereof (e.g. γ-linolenic acid, linoleic acid, arachidonic acid, oleic acid), and derivatives thereof, hydroquinone and derivatives thereof (e.g. arbutin), ubiquinone and ubiquinol, and derivatives thereof, vitamin C and derivatives thereof (e.g. ascorbyl palmitate, stearate, dipalmitate, acetate, Mg ascorbyl phosphates, sodium and magnesium ascorbate, diso-dium ascorbyl phosphate and sulfate, potassium ascorbyl tocopheryl phosphate, chito-san ascorbate), isoascorbic acid and derivatives thereof, tocopherols and derivatives thereof (e.g. tocopheryl acetate, linoleate, oleate and succinate, tocophereth-5, toco-phereth-10, tocophereth-12, tocophereth-18, tocophereth-50, tocophersolan), vitamin A and derivatives (e.g. vitamin A palmitate), the coniferyl benzoate of benzoin resin, rutin, rutinic acid and derivatives thereof, disodium rutinyl disulfate, dibutylhydroxytoluene, 4,4-thiobis-6-tert-butyl-3-methylphenol, butylhydroxyanisole, p-octylphenol, mono- (di- or tri-) methylbenzylphenol, 2,6-tert-butyl-4-methylphenol, pentaerythritol-tetrakis 3-(3,5-di-tert-butyl-4-hydroxyphenyl)!propionate, kojic acid, butylhydroxytoluene, butylhydroxyanisol, nordihydroguaiacic acid, nordihydroguaiaretic acid, trihydroxybutyrophenone, uric acid and derivatives thereof, selenium and selenium derivatives (e.g. selenomethionine), stilbenes and stilbene derivatives (e.g. stilbene oxide, trans-stilbene oxide). It is possible to use suitable derivatives (salts, esters, sugars, nucleotides, nucleosides, peptides and lipids) and mixtures of these specified active ingredients or salts or derivatives thereof. However, those skilled in the art will appreciate that it is possible to utilize different preservatives without departing from the scope of the present invention.

The preservatives are commercially manufactured and available through various companies.

According to an embodiment, the preservative is present in an amount of 0.1% to 30% w/w of the total composition. According to an embodiment, the preservative is present in an amount of 0.1% to 20% w/w of the total composition. According to an embodiment, the preservative is present in an amount of 0.1% to 10% w/w of the total composition. According to an embodiment, the preservative is present in an amount of 0.1% to 5% w/w of the total composition According to an embodiment, the humectant is selected from, but not limited to one or more of polyoxyethylene/polyoxypropylene copolymers, particularly block copolymers, such as the Synperonic PE series of copolymers available from Uniqema or salts, derivatives thereof. Other humectants are propylene glycol, monoethylene glycol, hexylene glycol, butylene glycol, ethylene glycol, diethylene glycol, poly (ethylene glycol), poly (propylene glycol), glycerol and the like; polyhydric alcohol compounds such as propylene glycol ether, derivatives thereof. Also other humectants include aloe vera gel, alpha hydroxyl acids such as lactic acid, egg yolk and eggwhite, glyceryl triacetate, honey, lithium chloride, etc. The non-ionic surfactants mentioned above also act as humectants. However, those skilled in the art will appreciate that it is possible to utilize different humectants without departing from the scope of the present invention. The humectants are commercially manufactured and available through various companies. According to an embodiment, the humectant is present in the range of 0.1% to 90% w/w of the total composition. According to an embodiment, the humectant is present in the range of 0.1% to 80% w/w of the total composition. According to a further embodiment, the humectant is present in the range of 0.1% to 50% w/w of the total composition. According to a further embodiment, the humectant is present in the range of 0.1% to 30% w/w of the total composition. According to a further embodiment, the humectant is present in the range of 0.1% to 20% w/w of the total composition.

According to a further embodiment, the humectant is present in the range of 0.1% to 10% w/w of the total composition. According to a further embodiment, the humectant is present in the range of 0.1% to 5% w/w of the total composition.

According to an embodiment, the ultraviolet absorbent which are used in aqeuous suspension composition are selected from, but not limited to one or more of 2-(2'-hydroxy-5'-methylphenyl)benzotriazole, 2-ethoxy-2'-ethyloxazalic acid bisanilide, succinic acid dimethyl-1-(2-hydroxyethyl)-4-hydroxy-2,2,6,6-tetramethylpiperidine polycondensate, benzotriazole compounds such as 2-(2'-hydroxy-5'-methylphenyl)benzotriazole and 2-(2'-hydroxy-4'-n-octoxyphenyl)benzotriazole; benzophenone compounds such as 2-hydroxy-4-methoxybenzophenone and 2-hydroxy-4-n-octoxybenzophenone; salicylic acid compounds such as phenyl salicylate and p-t-butylphenyl salicylate; 2-ethylhexyl 2-cyano-3,3-diphenyl acrylate, 2-ethoxy-2'-ethyl oxalic bisanilide, dimethyl succinate-1-(2-hydroxyethyl)-4-hydroxy-2,2,6,6-tetramethylpiperidine polycondensate and lignosulphonate or derivatives thereof. However, those skilled in the art will appreciate that it is possible to utilize different ultraviolet absorbents, without departing from the scope of the present invention. Such ultraviolet absorbents are commercially manufactured and available through various companies.

According to an embodiment, the UV ray scattering agents which are used in aqeuous suspension composition include titanium dioxide or the like may be used. However, those skilled in the art will appreciate that it is possible to utilize different UV ray scattering agents, without departing from the scope of the present invention. Such UV ray scattering agents are commercially manufactured and available through various companies.

However, those skilled in the art will appreciate that it is possible to utilize different other excipients, without departing from the scope of the present invention. Such excipients are commercially manufactured and available through various companies.

According to an embodiment, the composition further comprises at least one microbe. The microbes include fungi, bacteria, yeast, viruses, etc. The microbes are commercially developed and manufactured and available through various suppliers around the world.

According to an embodiment, the agricultural composition further comprise one or more of biostimulants, pesticidal actives, water soluble or water insoluble fertilizers, macronutrients and micronutrients.

According to an embodiment, the biostimulants are selected from one or more of, enzymes, humic acid, fulvic acid and bacteriospores. The biostimulants used, are commercially manufactured and available from various manufacturers. However, those skilled in the art will appreciate that it is possible to utilize different biostimulants without departing from the scope of the present invention.

According to an embodiment, the pesticidal actives include one or more of antifoulant, an insecticide, a fungicide, a herbicide, a nematicide, a pheromone, a defoliant, an acaricide, a plant growth regulator, an algicide, an antifeedant, an avicide, a bactericide, a bird repellent, a biopesticide, a biocide, a chemosterilant, a safener, an insect attractant, an insect repellent, a insect growth regulator, a mammal repellent, a mating disrupter, a desiccant, a disinfectant, a molluscicide, a antimicrobial, a miticide, an ovicide, a fumigant, a plant activator, a rodenticide, a synergist, a virucide, a repellent, a microbial pesticide, a plant incorporated protectant, other miscellaneous pesticidal active, or salts, derivatives and mixtures thereof.

According to an embodiment the composition can comprise at least one water soluble fertilizer. According to another embodiment, the water soluble fertilizer is selected from at least one of urea, sulphur based fertilizers, phosphate fertilizer such as MAP, DAP, potash fertilizer, nitrogen fertilizer, NPK fertilizers or derivatives, salts, complexes and mixtures thereof. According to an embodiment, the water soluble fertilizers include one or more of ferrous sulphate, magnesium sulphate, manganese sulphate, copper sulphate, sodium molybdate, zinc sulphate, boric acid or derivatives, salts, complexes and mixtures thereof. However, those skilled in the art will appreciate that it is possible to use different water soluble fertilizers without departing from the scope of the present invention. According to an embodiment, the composition comprises at least one water soluble fertilizer in the range of 0.1% to 60% by weight of the composition.

According to further embodiment, the macronutrients are selected from at least one of carbohydrates, fats, and proteins or salts, derivatives and mixtures therefore. However, those skilled in the art will appreciate that it is possible to use different macronutrients without departing from the scope of the present invention. The macronutrients are commercially manufactured and available through various companies.

According to an embodiment, the composition can comprise at least one micronutrient. According to furthermore embodiment, the micronutrients are selected from at least one of iron copper, zinc, manganese, boron, cobalt, chlorine, sodium, molybdenum, their salts, derivatives, chelated forms and mixtures thereof. The micronutrients further include Vitamins such as Vitamin A, Vitamin B, Vitamin C, Vitamin D, Vitamin E, Vitamin K, Carotenoids, Minerals such as Chromium, Copper, Fluorine, Iodine, Magnesium, Phosphorous, Potassium, Selenium, and Organic Acids such as Acetic acid, Citric acid, Lactic acid, Malic acid, Choline and Taurine or salts, derivatives and mixtures thereof. However, those skilled in the art will appreciate that it is possible to use different micronutrients without departing from the scope of the present invention. The micronutrients are commercially manufactured and available through various companies. According to an embodiment, the at least one micronutrient is present in an amount of 0.1% to 60% w/w of the composition.

According to an embodiment, the micronutrient can be a water insoluble nutrient. According to an embodiment, the water insoluble nutrient include one or more of, magnesium oxide, zinc oxide, manganese oxide, basic slag and iron oxide, silicon dioxide, manganese oxide, calcium oxide and elemental sulphur. However, those skilled in the art will appreciate that it is possible to use different water insoluble nutrients without departing from the scope of the present invention.

According to an embodiment, the bacteriospores include spores of one or more of *Agrobacterium radiobacter, Azotobacter chroococcum, Azospirillum lippoferum, Azospirillum brasilense, Azospirillum lipoferum, Azospirillum irakense, Azospirillum halopraeferens, Bacillus amyloliquifaciens, Bacillus altitudinis Bradyrhizobium japonicum, Bradyrhizobium elkanii, Bacillus acidiceler, Bacillus acidicola, Bacillus acidiproducens, Bacillus aealius, Bacillus aerius, Bacillus aerophilus, Bacillus agaradhaerens, Bacillus aidingemis, Bacillus akibai, Bacillus alcalophilm, Bacillus altitudmis, Bacillus algicola, Bacillus azotoformans, Bacillus badius, Bacillus atyabhaltai, Bacillus asahti, Bacillus atrophaem, Bacillus cohnii, Bacillus coagulam, Bacillus coahuilemls Bacillus flexus, Bacillus firmus, Bacillus pseudofirmus, Bacillus thuringenesis, Bacillus subtillus, Bacillus aizawai, Bacillus cereus, Bacillus circulans, B. circuians, Bacillus thermolactis, Bacillus kurstaki, Bacillus lentimorbus, Bacillus licheniformis, Bacillus megaterium, Bacillus mycoides, Bacillus mojavensis, Bacillus mucillagenosus, Bukholderia cepacia, Bacillus horii, Bacillus humi, Bacillus polygoni, Bacillus popillae, Bacillus pumilus, Bacillus sphaericus, Bacillus neahonii, Bacillus mizhmtemis, Bacillus niabensis, Bacillus macirti, Bacillus polymyxa, Bacillus sonoremis, Bacillus sporothenrnxlura, Bacillus sfratosphericus, Bacillus subierraneus, Bacillus taeamis, Bacillus tequilemis, Bacillus fhermamarcticm, Bacillus thermoamyhvorans, Bacillus thermacloacae, Bacillus thermolactis, Bacillus ihioparans, Pesudomonas fluorescens, Pseudomonas solanacearum, Pseudomonas syringae, Pseudomonas cepacia, Agrobacterium radiobacter, Azotobacter chroococcum Azospirillum lippoferum, Peaenibacillus azotofixans, Peaenibacillus durum, Pasteuria penetrans, Rhizobium leguminosarum, Rhizobium tropici, Bukholderia cepacia, Streptomyces lydicus, Thiobacillus thiooxidans and Thiobacillus novellus*. However, those skilled in the art will appreciate that it is possible to use different bacteriospores without departing from the scope of the present invention. The bacteriospores are commercially manufactured and available through various companies.

According to an embodiment, the aqueous suspension composition of the invention exhibits good suspensibility. The suspensibility of the aqeous suspension is the amount of active ingredient suspended after a given time in a column of liquid, of stated height, expressed as a percentage of the amount of active ingredient in the original suspension. The suspensibility of aqueous suspension concentrate is determined as per CIPAC MT-161 by preparing 250 ml of diluted suspension, allowing it to stand in a measuring cylinder under defined conditions, and removing the top nine-tenths. The remaining tenth is then assayed either chemically, gravimetrically or by solvent extraction, and the suspensibility is calculated.

According to an embodiment, the aqeuous suspension composition has a suspensibility of at least 10%. According to an embodiment, the aqeuous suspension composition has a suspensibility of at least 20%. According to an embodiment, the aqeuous suspension composition has a suspensibility of at least 30%. According to an embodiment, the aqeuous suspension composition has a suspensibility of at least 40%. According to an embodiment, the aqeuous suspension composition has a suspensibility of at least 50%. According to an embodiment, the aqeuous suspension composition has a suspensibility of at least 60%. According to an embodiment, the aqeuous suspension composition has a suspensibility of at least 70%. According to an embodiment, the aqeuous suspension composition has a suspensibility of at least 80%. According to an embodiment, the aqeuous suspension composition has a suspensibility of at least 90%. According to an embodiment, the aqeuous suspension composition has a suspensibility of at least 95%. According to an embodiment, the aqeuous suspension composition has a suspensibility of at least 100%.

According to an embodiment, the aqueous suspension composition of the invention has a good pourability. The pourability is the measure of percent of residue.

According to an embodiment, the pourability of the suspension concentrate is determined as per CIPAC MT-161 by allowing the suspension concentrate to stand for 24 hrs and the amount remaining in the container after a standardized pouring procedure is determined. The container is rinsed and the amount then remaining is determined and the maximum residue in percent is calculated. According to a further embodiment, the pourability of aqeuous suspension composition is less than 15%. According to further embodiment, the pourability of aqeuous suspension composition is preferably less than 10%. According to further embodiment, the pourability of aqeuous suspension composition is more preferably less than 5%.

According to an embodiment, the aqeuous suspension composition has a particle size in the range of 0.1 microns to 60 microns. According to further embodiment, the aqeuous suspension composition has a particle size in the range of 0.1 microns to 50 microns. According to further embodiment, the aqeuous suspension composition has a particle size in the range of 0.1 microns to 40 microns. According to further embodiment, the aqeuous suspension composition has a particle size in the range of 0.1 microns to 30 microns. According to further embodiment, the aqeuous suspension composition has a particle size in the range of 0.1 microns to 20 microns. According to further embodiment, the aqeuous suspension composition has a particle size in the range of 0.1 microns to 12 microns. According to further embodiment, the aqeuous suspension composition has a particle size in the range of 0.1 microns to 10 microns. According to further embodiment, the aqeuous suspension composition has a particle size in the range of 0.1 microns to 8 microns. According to further embodiment, the aqeuous suspension composition has a particle size in the range of 0.1 microns to 5 microns. According to further embodiment, the aqeuous suspension composition has a particle size in the range of 0.1 microns to 2 microns. According to further embodiment, the aqeuous suspension composition has a particle size in the range of 0.1 microns to 1 micron.

According to an embodiment, the aqeuous suspension composition demonstrates superior stability towards heat, light, temperature and caking. According to an embodiment, the stability exhibited by the aqueous suspension composition is more than 5 years. According to further embodiment, the stability exhibited by the aqueous suspension composition is more than 3 years. According to further embodiment, the stability exhibited by the aqeuous suspension composition is more than 2 years. According to further embodiment, the stability exhibited by the aqeuous suspension composition is more than 1 year. According to further embodiment, the stability exhibited by the aqeuous suspension composition is more than 10 months. According to further embodiment, the stability exhibited by the aqeuous suspension composition is more than 8 months. According to further embodiment, the stability exhibited by the aqeuous suspension composition is more than 6 months. According to further embodiment, the stability exhibited by the aqeuous suspension composition is more than 3 months. According to further embodiment, the stability exhibited by the aqeuous suspension composition is more than 1 month.

According to another embodiment, the decomposition of algae comprised in the aqeuous suspension composition is less than 20% under accelerated storage conditions (ATS). According to further embodiment, the decomposition of algae comprised in the aqeuous suspension composition is less than 15% under accelerated storage conditions (ATS). According to further embodiment, the decomposition of algae comprised in the aqeuous suspension composition is less than 10% under ATS. According to further embodiment, the decomposition of algae comprised in the aqeuous suspension composition is less than 5% under ATS. According to further embodiment, the decomposition of algae comprised in the aqeuous suspension composition is less than 2% under ATS. According to further embodiment, the decomposition of algae comprised in the aqeuous suspension composition is less than 1.5% under ATS. According to further embodiment, the decomposition of algae comprised in the aqeuous suspension composition is less than 1% under ATS. According to further embodiment, the decomposition of algae comprised in the aqeuous suspension composition is less than 0.5% under ATS. According to further embodiment, the decomposition of algae comprised in the aqeuous suspension composition is less than 0.3% under ATS. According to further embodiment, the decomposition of algae comprised in the aqeuous suspension composition is less than 0.1% under ATS. According to further embodiment, the decomposition of algae comprised in the aqeuous suspension composition is less than 0.05% under ATS. According to further embodiment, the aqeuous suspension composition is stable and demonstrates substantially no decomposition of active under ATS.

According to an embodiment, the aqeuous suspension composition of the invention exhibits superior viscosity. The viscosity of a fluid is a measure of its resistance to gradual deformation by shear stress or tensile stress. According to an embodiment, viscosity of the suspension concentrates is determined by (as per CIPAC MT-192). A sample is transferred to a standard measuring system. The measurement is carried out under different shear conditions and the apparent viscosities are determined. During the test, the temperature of the liquid is kept constant. According to an embodiment, the aqeuous suspension composition has a viscosity at 25° C. of about 10 cps to about 3000 cps. According to an embodiment, the aqeuous suspension composition hasa viscosity at 25° C. of about 10 cps to about 2000 cps. According to an embodiment, the aqeuous suspension composition hasa viscosity at 25° C. of about 10 cps to about 1000 cps. According to an embodiment, the aqeuous suspension composition hasa viscosity at 25° C. of about 10 cps to about 500 cps.

According to another embodiment, the invention relates to the process for preparing the aqueous suspension composition. According to further embodiment, the invention relates to a process for preparing the aqeuous suspension composition comprising at least one algae, at least one surfactant and at least one structuring agent.

According to an embodiment, the process of preparing the aqueous suspension composition involves homogenization of the excipient by feeding them into a vessel provided with stirring facilities. The algae is further added to the homogenised blend and stirring continued for approximately 5 to 10 minutes until the total mixture becomes homogeneous. Subsequently, the suspension obtained is passed through the wet mill. Then, requisite quantity of the structuring agent is added to the suspension obtained, under continuous homogenization.

According to another embodiment, the aqeuous suspension formulation is in the form of seed treatment formulation or a flowable suspension formulation or an aqueous dispersion formulation or suspension concentrate or emulsion concentrate formulation.

According to an embodiment, the invention further relates to the use of the aqeuous suspension composition as at least one of a nutrient composition, a plant strengthener composition, a soil conditioner composition, plant fortification, plant protection and a yield enhancer composition.

According to an embodiment, the invention further relates to a method of fortification of the crops or the plant. The method involves application of the aqeuous suspension composition comprising at least one algae, at least one surfactant and at least one structuring agent.

According to further embodiment, the invention relates to a method of application of an effective amount of the aqeuous suspension composition, wherein the composition is applied to the seeds, seedlings, crops, a plant, plant propagation material, locus, parts thereof or to the surrounding soil.

According to an embodiment, the invention further relates to a method of improving the plant health, improving the plant nutrition by facilitating the uptake of essential nutrients, protecting the plant, enhancing the plant yield, strengthening the plant or conditioning the soil; the method comprising treating at least one of seeds, seedling, crops, a plant, plant propagation material, locus, parts thereof or to the surrounding soil with effective amount of the aqeuous suspension composition comprising at least one alga and at least one one surfactant and at least one structuring agent, in the form of an aqeuous suspension.

A. Preparation Examples:

The following examples illustrate the basic methodology and versatility of the composition of the invention.

TABLE 1

| Constituents | Example 1 | Example 2 | Example 3 | Example 4 | Example 5 | Example 6 |
|---|---|---|---|---|---|---|
| Ratio of algae:surfactant | 2:1 | 50:1 | 1:50 | 10:1 | 5:1 | 7:1 |
| Lithothamnium calcereum | 10 | 50 | 1 | — | — | — |
| Sargassum | — | — | — | — | — | 35 |
| Chlorella pyrenoidosa | — | — | — | — | 10 | — |
| Aschophyllum nodosum | — | — | — | 25 | — | — |
| Lignin sulphonate | — | 1 | 50 | — | — | 5 |
| Glyreryl laureate | 5 | — | — | 2.5 | 2 | — |
| 1,2-Benzisothiazolin-3-one | 0.2 | — | — | — | — | 2 |
| Sodium Benzoate | | — | — | 1 | 0.5 | |
| Monoethyl glycol | 4 | — | — | 5 | 5.3 | — |
| butylene glycol | — | — | — | — | — | 3 |
| Xanthum gum (4%) | — | 5 | 1 | — | — | 1.5 |
| Gum Arabic (20%) | 2.2 | — | — | 2.8 | 3.1 | — |
| Water | 78.6 | 44 | 48 | 63.7 | 79.1 | 53.5 |
| Total | 100 | 100 | 100 | 100 | 100 | 100 |

| Constituents | Example 7 | Example 8 | Example 9 | Example 10 | Example 11 | Example 12 |
|---|---|---|---|---|---|---|
| Ratio of algae:surfactant | 100:1 | 3:1 | 6:1 | 100:1 | 10:1 | — |
| Lithothamnium calcereum | — | — | 15 | — | 70 | 10 |

TABLE 1-continued

| | | | | | | |
|---|---|---|---|---|---|---|
| Sargassum | — | — | — | — | — | — |
| Chlorella pyrenoidosa | — | — | — | 40 | — | — |
| Aschophyllum nodosum | — | 15 | — | — | — | — |
| Spirulina Plantensis | 10 | — | — | — | — | — |
| Sulphur a.i. | — | 25 | 5 | — | — | — |
| Zinc Oxide | — | 12 | — | — | — | — |
| Lignin sulphonate | — | 5 | 2.5 | — | 7 | — |
| Glyreryl laureate | 0.1 | — | — | 0.4 | — | — |
| Sodium Benzoate | 0.6 | — | — | 0.8 | — | — |
| Monoethyl glycol | 0.25 | 2.2 | 1 | 2.2 | — | — |
| butylene glycol | — | — | — | — | — | — |
| Xanthum gum (4%) | 1.2 | 4 | 0.5 | — | 0.01 | — |
| Gum Arabic (20%) | — | — | — | 3.5 | — | — |
| Water | 87.85 | 36.8 | 76 | 53.1 | 22.99 | 90 |
| Total | 100 | 100 | 100 | 100 | 100 | 100 |

Example 1: 5 parts of glyceryl laurate and 4 parts of monoethyl glycol were homogenised by feeding them into a vessel provided with stirring facilities. 10 parts of *Lithothamnium calcerum* is further added to the homogenised blend and stirred continuously for approximately 10 minutes until the total mixture was homogeneous. To the above mixture, 0.2 parts of 20% aqueous dipropylene glycol solution of 1, 2-benzisothiazolin-3-one was added. Subsequently, the suspension obtained was passed through the wet mill. Then, 0.2 part of gum arabic was added under continuous homogenization to obtain the suspension concentrate The samples 2-11 with constituents as set forth in Table 1 were prepared by similar procedure as mentioned in Example 1.

Sample 12 is prepared by mixing 10 parts of algae with 90 parts water whereby the resulting composition swells and forms a thick paste, demonstrating that it is difficult to apply pure algae.

Sample 10 where the algae concentration is greater than 35%, has reduced suspensibility and settles at bottom of the container, when the algae to surfactant ratio (100:1) is beyond 50:1 to 1:30. Further high pourability value results in difficulty in transferring the sample from the container.

B. Comparison of Physical Properties:

TABLE 2

| Sr. no. | Composition details | Ratio of algae:surfactant | Suapensibility (%) | Particle size (um) D50 | Viscosity CPS | Pourability (%) |
|---|---|---|---|---|---|---|
| S1 | Lithothamnium aq. Suspension (10%) as per embodiment of present invention | 2:1 | 91.6 | 4.2 | 290 | 2.3 |
| S2 | Chlorella aq. Suspension (10%) as per embodiment of present invention | 5:1 | 90.1 | 3.8 | 370 | 2.7 |
| S3 | Ascophyllum aq. suspension (25%) as per embodiment of present invention | 10:1 | 92.5 | 4.1 | 150 | 4.2 |
| S4 | Chlorella aq. Suspension (40%) | 100:1 | 75.4 | 5.6 | 3450 | 20.1 |
| S5 | Lithothamnium aq. Suspension (70%) | 10:1 | 74.2 | 6.2 | 3210 | 19.2 |

It can be seen from above table that samples S1, S2 and S3 as per the embodiment of present invention shows suspensibilty of 91.6%, 90.1 and 92.5% respectively whereas, S4 having algae to surfactant ratio beyond the embodiment of the present invention and S5 having concentration beyond the embodiment of the present invention shows poor suspensibilty of 75.4% and 74.2% respectively. Further S4 and S5 also show reduced pourability of 20.1 and 19.2 respectively.

C. Stability Studies:

TABLE 3

Comparision of initial suspensibilty and suspensibility after 14 days of storage at 54 degree Celcius (on ATS)

| Sample No. | Composition details | Initial Suspensibility % | Suspensibilty On ATS % |
|---|---|---|---|
| S1 | *Liothothamnium* 10% aq. suspension with algae to surfactant Ratio of algae:surfactant (2:1) | 91.6 | 86.2 |
| S2 | *Chlorella* aq. Suspension (10%) as per embodiment of present invention Ratio of algae:surfactant (5:1) | 90.1 | 84.9 |
| S3 | *Ascophyllum* aq. suspension (25%) as per embodiment of present invention Ratio of algae:surfactant (10:1) | 92.5 | 86.6 |

It can be seen from Table 2 that samples S1 and S2 (as per the embodiments of the present invention) shows initial suspensibilty of 91.6% and 90.1% respectively and even after ATS it shows suspensibilty of 86.2% and 84.9% respectively. Further sample S3 (as per the embodiment of the present invention) also shows initial suspensibilty of 92.5% and after ATS it shows suspensibilty of 86.6%

Field Studies:—1

A. Maize Crop

Field trial was conducted at Laxmanpura (Idar) village to evaluate various compositions for treatment of maize. The plot size was 3984 sqm. All the recommended agronomic practices were followed. Treatments were applied through drip irrigation. An attempt was also made to apply pure spirulina powder; however, these products clogged the irrigation nozzles and could not be applied. Also, no urea or fertilizer is applied in treatments of the embodiments of the invention.

Observations for, uptake of nutrients N, P & K, Plant height, Number of branches/plant, Number of pods/plant and yield were made before and after 30 days and 90 days of application. Plant Height was recorded from 10 selected plants from each plot per replication. Number of Branches were recorded from 10 selected plants from each plot per replication. Number of pods were counted from 10 selected plants from each plot per replication. Yield was recorded from each plot and converted in to t/ha.

The observations were recorded as shown below:

Bioefficacy Results:

TABLE 4

EFFICACY OF VARIOUS TREATMENTS ON MAIZE CROP NUTRITION

| Sr. No. | Treatments | Formulation Dose gm or ml/ha | Total Nitrogen (kg/ha) in soil | | | Available Phosphorus (kg/ha) in soil | | | Available Potash (kg/ha) in soil | | |
|---|---|---|---|---|---|---|---|---|---|---|---|
| | | | DBA | 30 DAA | 90 DAA | DBA | 30 DAA | 90 DAA | DBA | 30 DAA | 90 DAA |
| T1 | 10% *Spirulina* aq. suspension as per the embodiment of the present invention | 7500 | | 941 | 685 | | 79.5 | 41.93 | | 159 | 50 |
| T2 | 10% *Chlorella* aq. Suspension as per the embodiments of the present invention | 7500 | 1047 | 937 | 712 | 90.74 | 74.66 | 44.21 | 208 | 162 | 54 |
| T3 | 25% *Ascophyllum* aqueous suspensionas per embodiments of present invention | 3000 | | 956 | 693 | | 76.85 | 42.5 | | 156 | 52 |

TABLE 4-continued

EFFICACY OF VARIOUS TREATMENTS ON MAIZE CROP NUTRITION

| Sr. No. | Treatments | Formulation Dose gm or ml/ha | Total Nitrogen (kg/ha) in soil | | | Available Phosphorus (kg/ha) in soil | | | Available Potash (kg/ha) in soil | | |
|---|---|---|---|---|---|---|---|---|---|---|---|
| | | | DBA | 30 DAA | 90 DAA | DBA | 30 DAA | 90 DAA | DBA | 30 DAA | 90 DAA |
| T4 | WSF (19-19-19) commercially available product containing 19% of N: 19% of P: 19% of K | 7500 | | 992 | 896 | | 82.26 | 61.02 | | 173 | 82 |
| T5 | Control | — | | 1002 | 976 | | 86.95 | 83.29 | | 192 | 96 |

DBA—Date Before Application,
DAA—Date After Application

The uptake of nitrogen, phosphorus and potash were recorded before application and on 30th and 90th days after application. From the data represented in table 4, it has been observed that teatment T1 with 10% spirulina aqueous suspension as per the embodiment of present invention followed by treatment T3 with 25% *ascophyllum aqueous* suspension as per the embodiment of present invention followed by teatment T2 with 10% *Chlorella* aqueous suspension recorded minimum nitrogen content in soil at 90 days after application which indicates significant nitrogen uptake by plant as compared to the nitrogen uptake observed with the conventional water soluble fertilizer. Further in case of phosphorus uptake, it has been observed that treatment T1 with 10% *Spirulina* based composition as per the present invention recorded highest phosphorus uptake followed by the treatment T3 with 25% *ascophyllum aqueous* suspension followed by treatment T2 with 10% *Chlorella* aqueous suspension as per the present invention.

Further table 4 indicates that teatment T1 followed by treatment T3 followed by treatment T2, recorded high potash uptake. It can be seen that compositions with the embodiments of the present invention showed a significant increase in the nitrogen, phosphorous and potash uptake as compared to treatments with conventional water soluble fertilizers with NPK.

The uptake results are all the more superior and surprising as no urea or any other chemical fertilizer was applied during the trial and also during the previous crop cycle. Thus the region/area where compositions of the present invention were applied, were free of chemical nutrients for over a year. Despite no application of chemical fertilizers, it is surprising to note that the uptake of nutrients such as nitrogen, potash and phosphorous from the soil with the composition of the present embodiment was significantly high. In fact, the results of the present invention are more surprising, because, even with the application of chemical water soluble fertilizers with high portions of N, P & K applied to the soil, these nutrients were not all taken up by the plant in treatment T4.

TABLE 5

EFFICACY OF VARIOUS TREATMENTS ON MAIZE GROWTH AND DEVELOPMENT

| Sr. No. | Treatments | Formulation Dose gm or ml/ha | Plant height (cm) | | Leaf color | |
|---|---|---|---|---|---|---|
| | | | 30 DAA | 90 DAA | 30 DAA | 90 DAA |
| T1 | 10% *Spirulina* aqueous Suspension as per the embodiment of the present invention | 7500 | 182.56 | 258.5 | 4.91 | 3.69 |
| T2 | 10% *Chlorella* aqueous Suspension as per the embodiment of the present invention | 7500 | 180.43 | 260.7 | 4.80 | 3.70 |
| T3 | 25% *Ascophyllum* aqueous suspension as per the embodiment of the present invention | 3000 | 182.03 | 258.8 | 4.87 | 3.67 |
| T4 | WSF (19-19-19) commercially available product containing 19% of N: 19% of P: 19% of K | 7500 | 178.33 | 249.03 | 4.73 | 3.30 |
| T5 | Control | — | 176.37 | 235.83 | 4.70 | 3.24 |

DAA—Days after Application

The Plant height was recorded at 30th and 90th days after application. From the above table, it can be observed that after 90th day of application, treatment T2 showed maximum plant height of 260.70 cm with a 4.68% increase over treatment T4 with the conventional NPK based water soluble fertilizer whereas treatment T3 showed a plant height of 258.8 cm which is a 3.92% increase followed by treatment T1 which shows 258.5 cm which is a 3.80% increase as compared to treatment T4 with the conventional water soluble fertilizer.

Also, Leaf color was recorded at 30th and 90th days after application with leaf color chart. It can be observed that at 90th days after application, the maximum leaf color of 3.70 was exhibited by composition of treatment T2 followed by treatment T1 followed by treatment T3 as against the leaf colour with treatment T4 with the conventional water soluble fertilizer.

TABLE 6

EFFICACY OF VARIOUS TREATMENTS ON MAIZE YIELD AND YIELD PARAMETERS

| Sr. No. | Treatments | Formulation Dose gm or ml/ha | Ear length (cm) | No. of kernel row/ear | No. of kernel/ row | Ear weight (gm) | Grain weight (gm)/Ear | Shelling % |
|---|---|---|---|---|---|---|---|---|
| | | | At harvest | | | | | |
| T1 | 10% *Spirulina* aq. Suspension as per embodiments of present invention | 7500 | 27.96 | 14.67 | 35.80 | 164.35 | 128.24 | 78.03 |
| T2 | 10% *Chlorella* aq. Suspension as per embodiment of present invention | 7500 | 28.03 | 15.15 | 36.12 | 163.83 | 128.1 | 78.19 |
| T3 | 25% *Ascophyllum* aqueous suspension as per embodiment of present invention | 3000 | 28.37 | 15.2 | 36.07 | 163.31 | 127.2 | 77.89 |
| T4 | WSF (19-19-19) commercially available product containing 19% of N: 19% of P: 19% of K | 7500 | 27.64 | 14.8 | 36.07 | 154.21 | 117.23 | 74.02 |
| T5 | Control | — | 27.38 | 13.6 | 33.8 | 155.54 | 116.85 | 72.13 |

From the data reported in the table 6, it can be observed that the maximum shelling of 78.19% was observed in treatment T2 with 10% *Chlorella* aqueous suspension as per the embodiment of the present invention followed by Treatment T1 with 10% *Spirulina* aqueous suspension as per embodiment of present invention followed by Treatment T3 with 25% *Ascophyllum aqueous* suspension as per embodiment of present invention. Furthermore treatments T1, T2 and T3 also showed a surprising 6.57%, 6.23 and 5.90% increase, respectively, in the ear weight and 9.39%, 9.27% and 8.50% increase respectively, in the grain weight as compared to Treatment 4 with conventional water soluble fertilizer.

TABLE 7

EFFICACY OF VARIOUS TREATMENTS ON MAIZE YIELD AND YIELD PARAMETERS:

| Sr. No. | Treatments | Formulation Dose gm or ml/ha | Total plant weight (kg/sqm) | 100 kernel weight (gm) | Gram yield (q/ha) |
|---|---|---|---|---|---|
| | | | At harvest | | |
| T1 | 10% *Spirulina* aqueous Suspension as per the embodiment of present invention | 7500 | 2.916 | 29.12 | 133.92 |
| T2 | 10% *Chlorella* aqueous Suspension as per the embodiment of present invention | 7500 | 2.752 | 26.48 | 130.44 |
| T3 | 25% *Ascophyllum* aqueous suspension as per the embodiment of the present invention | 3000 | 3.083 | 27.51 | 132.02 |
| T4 | WSF (19-19-19) commercially available product containing 19% of N:19% of P:19% of K | 7500 | 2.887 | 25.75 | 126.1 |
| T5 | Control | — | 2.566 | 24.3 | 120.85 |

From the data represented in table 7, it has been observed that maximum grain yield is obtained in Treatment T1 with 10% spirulina aqueous suspension as per the embodiment of the present invention, followed by treatment T3 with 25% *Ascophyllum aqueous* suspension as per the embodiment of the present invention, followed by treatment T2 with 10% *Chlorella* aqueous suspension as per the embodiment of the present invention as compared to conventional water soluble fertilizer with 19% nitrogen, 19% phosphorous and 19% potassium in Treatment T4. In fact treatment T1 showed 6.2% increase in the grain yield, Treatment T3 showed a 4.69% and Treatment 2 showed a 3.44% increase in the grain yield over Treatment 4 with the conventional water soluble fertilizers. Further the treatments T1, T2 and T3 with compositions as per the embodiments of the present invention also showed a significant increase in the total plant weight and the kernel weight as compared to the treatment with the conventional water soluble fertilizers. It was observed that the composition of the present invention, demonstrated enhanced, efficacious and superior behaviour in the fields.

In fact the compositions as per the invention not only showed an increase in the yield but also showed surprising improvement in the plant physiological parameters. The compositions as per the embodiment of the invention showed a profusely developed root system, increased plant height, bigger leaf blade, less dead basal leaves, stronger tillers, greener leaf color, increased tillering, increased shoot growth, improved plant vigor, earlier flowering, more productive tillers, less plant verse (lodging), improved chlorophyll content of the leaves, protein content, photosynthetic activity, early seed germination and early grain maturity. The plants also exhibited improved water stress tolerance, improved quality of the produce, improved fortification of the plant, improved defence mechanism of the plant such as induced tolerance against fungi, bacteria, weeds, viruses and/or insects, conditioning the soil and such other advantages.

Field Studies:—2

Field trial was conducted for the evaluation of different treatments at Sabalvad (idar) village to evaluate various compositions for treatment of tomato. The plot size was 1028 sqm. All the recommended agronomic practices were followed. Treatment were applied by drip irrigation. Also, urea or any other fertilizer was not applied along with samples during the field studies. It was observed that *Lithothamnium* pure powder difficult to apply via drip application and so it needed several rounds of mechanical intervention to complete the treatment.

Observations for total plant weight, weight of the fruit and yield were made after application.

Crop vigor is measured on basis of rating scale based on 0 to 10 where a higher value is indicative of vigourous growth. Other parameters like plant weight, fruit weight was recorded from 10 selected plants from each plot per replication. Yield was recorded from each plot and converted in to t/acre The observations were recorded as shown below

TABLE 8

| Sr. No. | Treatments | Active content (g/ha) | Calcium content % | Formulation Dose gm or ml/ha | At harvest ||||
|---|---|---|---|---|---|---|---|---|
| | | | | | Crop vigor | Total plant weight (kg/sqm) | 10 Fruit weight (gm) | Total Yield (t/acre) |
| T1 | *Lithothamnium calcereum* aq. Suspension (35%) as per embodiment of present invention | 1093 | 11.2 | 9760 | 8 | 1.56 | 1180 | 48.8 |
| T2 | Commercially available Yara cal trac product (23.1% calcium) | 1092 | 23.1 | 4731 | 6 | 1.43 | 1105 | 46.9 |
| T3 | *Lithothamnium calcerum* powder | 1092 | 32 | 3415 | 6 | 1.37 | 1089 | 46.2 |
| T3 | Control | — | — | — | 5 | 1.31 | 1062 | 38.3 |

It was observed from the above table that treatment T1 with 35% *Lithothamnium calcereum* based aqueuous suspension as per the embodiment of present invention showed a 9.09% increase in the total plant weight and a 4.05% increase in the total crop yield as compared to Treatment T2 with a commercially available calcium based product (Yara Caltrac) containing 23.1% Calcium, when both treatments T1 and T2 have the same amount of calcium added to the soil. Also, it is observed that treatment T1 with 35% *Lithothamnium calcereum* based aqueous suspension as per the embodiment of present invention showed 5.63% increase in the total crop yield as compared to Treatment T3 with a *Lithothamnium calcerum* powder.

The composition of treatment T1 also showed a significant increase in the fruit weight as compared to the commercially available composition. The results in the yield enhancement are particularly surprising when no chemical fertilizers or nutrients had been applied in the regions where the trials were carried, for over a year preceeding the trials.

Field Studies:—3

Field trial was conducted for the evaluation of different treatments at Taluka-Tharad Dist-Banaskantha village in Gujarat to evaluate various compositions for treatment of Cucumber. The plot size was 1048 sqm. All the recommended agronomic practices were followed. Single sprays of each treatment were applied with the help of knapsack sprayer. The *Sargassum* pure powder tends to block the nozzle of the sprayer which made it difficult to spray with knapsack sprayer. So it needed several rounds of mechanical intervention to complete treatment.

Observations for % disease incidence of Powdery mildew in Cucumber were made at 5 DAS, 10 DAS, 15 DAS and 20 DAS after application.

The observations were recorded as shown below:

TABLE 9

EFFICACY OF VARIOUS TREATMENTS ON DISEASE INCIDENCE

| Sr. No. | Treatments | Active content ml/ha | Formulation Dose gm or ml/ha | Disease incidence % | | | | |
|---|---|---|---|---|---|---|---|---|
| | | | | 5 DAS | 10 DAS | 15 DAS | 20 DAS | Mean |
| T1 | *Sargassum* Sp aq. Suspension (35%) as per embodiment | 1050 | 3000 | 22.18 | 10.68 | 8.07 | 6.02 | 11.74 |
| T2 | *Sargassum* pure powder | 1050 | 1050 | 21.70 | 18.16 | 15.04 | 8.74 | 15.91 |
| T3 | Control | — | — | 24.67 | 26.62 | 29.41 | 34.25 | 28.74 |

From the above table, it can be observed that treatment T1 with 35% *Sargassum* based aqueuous suspension as per the embodiment of present invention showed a surprising disease control of as high as 26.20% of powdery mildew as compared to Treatment T2 with commercially available sargassum pure powder.

Field Studies:—4

Field trial was conducted for the evaluation of different treatments at Savasala (Idar) village to evaluate various compositions for treatment of green gram. The plot size was 1840 sqm. All the recommended agronomic practices were followed.

Efficacy of the prophylactic action and efficacy of seed treatment samples on Green gram seeds against fungi is as shown below. Seeds were treated with recommended dosage. The observations were recorded as shown below:

TABLE 10

EFFICACY OF VARIOUS TREATMENTS ON GERMINATION

| Treatment | Treatments | Dose ml or gm/kg seed | Germination Number of plants/sqm 10 DAS | Weight of seedlings (gm) | |
|---|---|---|---|---|---|
| | | | | Fresh weight/5 plant | Dry weight/5 plant |
| T1 | *Spirulina* 5% + sulphur 30.5% + zinc 14.5% according to an embodiment of the invention | 3 | 34.40 | 157.50 | 24.25 |
| T2 | Sulphur 30.5% + zinc 14.5% | 3 | 30.20 | 151.25 | 21.75 |
| T3 | Control | — | 27.70 | 149.50 | 20.25 |

From the above table, it can be observed that treatment T1 with 5% *Spirulina* along with nutrient based aqueous suspension as per the embodiment of present invention showed a surprisingly germination rate of as high as 13.90% as compared to Treatment T2 with only nutrients.

TABLE 11

EFFICACY OF VARIOUS TREATMENTS ON DISEASE INCIDENCE

| Treatment No. | Treatment | Dose ml/kg seed | Anthracnose | | | | | Rust | | | | | Powdery Mildew | | | | |
|---|---|---|---|---|---|---|---|---|---|---|---|---|---|---|---|---|---|
| | | | 45 DAS | 60 DAS | 75 DAS | Mean | % control | 45 DAS | 60 DAS | 75 DAS | mean | % control | 45 DAS | 60 DAS | 75 DAS | Mean | % control |
| T1 | *Spirulina* 5% + sulphur 30.5% + | 3 | 13.33 | 26.67 | 33.33 | 24.44 | 56.00 | 0.00 | 0.00 | 0.00 | 0.00 | 100.00 | 0.00 | 10.00 | 53.33 | 21.11 | 32.14 |

TABLE 11-continued

EFFICACY OF VARIOUS TREATMENTS ON DISEASE INCIDENCE

| | | | % Disease incidence | | | | | | | | | | | | | |
|---|---|---|---|---|---|---|---|---|---|---|---|---|---|---|---|---|
| | | Dose | Anthracnose | | | | | Rust | | | | | Powdery Mildew | | | | |
| Treatment No. | Treatment | ml/kg seed | 45 DAS | 60 DAS | 75 DAS | Mean | % control | 45 DAS | 60 DAS | 75 DAS | mean | % control | 45 DAS | 60 DAS | 75 DAS | Mean | % control |
| | zinc 14.5% according to an embodiment of the invention | | | | | | | | | | | | | | | | |
| T2 | Sulphur 30.5 + zinc 14.5 | 3 | 23.33 | 33.33 | 36.67 | 31.11 | 44.00 | 0.00 | 0.00 | 3.33 | 1.11 | 66.70 | 0.00 | 13.33 | 53.33 | 22.22 | 28.58 |
| T3 | Control | — | 46.67 | 60.00 | 60.00 | 55.56 | 0.00 | 0.00 | 3.33 | 6.67 | 3.33 | 0.00 | 0.00 | 20.00 | 73.33 | 31.11 | — |

From the above table, it can be observed that treatment T1 with spirulina, sulphur and zinc based aqueous suspension as per the embodiment of present invention showed a surprising disease control of as high as 56.00% of anthracnose and 100% in rust as compared to treatment T2 with sulphur and zinc which shows only 44.0% and 66.70% control. Also 32.14% disease control observed in powdery mildew with treatment T1 as compared to treatment T2 which shows only 28.58% of control.

It has been observed that the composition of the present invention, demonstrates enhanced, efficacious and superior behaviour in the fields. In fact, various advantageous properties associated with the compositions according to the invention, include but are not limited to adequate control of the pests such as insects, fungi, diseases, weeds or mites, advantageous behavior during formulating and/or upon application, improved stability, improved toxicological and/or ecotoxicological behaviour, improved crop characteristics including crop yields, crop qualities such as improved nutrient content, more developed root system, increase in plant height, bigger leaf blade, less dead basal leaves, stronger tillers, along with improved physiological parameters of the crop.

Through the composition of the present invention, the number of applications or nutrients, fertilizers or pesticides are minimized. The composition is highly safe to the user and to the environment. The composition is also cost-effective, as it provides much greater simultaneous control and it is used in a variety of crops with a broader spectrum of protection. Also, the compositions serve as an intervention application between very specific actives likely to lead to resistance in areas of epidemic and high frequency of pesticidal/fertilizer applications saves labour costs and avoids unnecessary exposure of pesticides/fertilizers to farmers.

It is observed that numerous modifications and variations can be effectuated without departing from the true spirit and scope of the novel concepts of the present invention. It is to be understood that no limitation with respect to the specific embodiments illustrated is intended or should be inferred.

I claim:

1. An aqueous suspension composition consisting essentially of at least one algae selected from green algae, red algae, golden algae, brown algae, golden-brown algae, blue algae, blue-green algae or their species, wherein the at least one algae is present in the range of 0.1%-65% by weight of the total composition; at least one surfactant in the range of 0.1%-50% by weight of the total composition; and at least one structuring agent in the range of 0.01%-5% by weight of the total composition; wherein the composition comprises particles suspended therein with a particle size in the range of about 0.1 micron-60 microns.

2. The aqueous suspension composition of claim 1, wherein the ratio of total weight of algae to the total weight of the surfactant is in the range of from 100:1 to 1:50 when the composition comprises the algae in a concentration of less than 35% by weight of the total composition.

3. The aqueous suspension composition of claim 1, wherein the ratio of total weight of algae to the total weight of the surfactant is in the range of from 50:1 to 1:30 when the composition comprises the algae in a concentration of more than 35% and up to 65% by weight of the total composition.

4. The aqueous suspension composition of claim 1, wherein the algae comprises one or more of Phaeophyceae, Ochrophytes, Glaucophytes, Rhodoplasts, Rhodophytes, Chloroplasts, Ochrophytes, Chrysophyta, Raphidiophyceae, Eumastigophyceae, Xanthophyceae, Synurophytes, Silicoflagellata, Sarcinochrysophyceae, Heterokonts, Crytophytes, Haptophytes, Euglenophytes, Chlorophytes, Charophytes, Embrophyta or Chlorarachniophytes or their derivatives, species and mixtures thereof.

5. The aqueous suspension composition of claim 1, wherein the algae comprises at least one of *Spirulina* Sp., *Arthrospira* Sp., *Chlorella* Sp., *Anabaena* Sp., *Sargassum* Sp., *Scenedesmus* Sp., *Aphanizomenon* Sp., *Dunaliella* Sp., *Phymatolithion* Sp., *Lithothamnium* Sp., *Ascophyllum* Sp., *Enteromorpha* Sp., *Tetraselmis* Sp., *Prymnesium* Sp., *Chlamydomonas* Sp., *Euglena* Sp., *Caulerpa* Sp., *Padina* Sp., *Urophora* Sp., *Chondria* Sp., *Caulerpa* Sp., *Lyngby* Sp., *Prasiola* Sp., *Gymnopilus* Sp., *Melanothamnus* Sp., *Turbeneria* Sp., *Mastigocladopsis* Sp., *Hydroclathrus* Sp., *Padina* Sp., *Cystoseira* Sp., *Laminaria* Sp., *Fucus* Sp., *Ulva* Sp. or their derivatives, species and mixtures thereof.

6. The aqueous suspension composition of claim 1, wherein the composition has a pourability of less than 15% residue.

7. The aqueous suspension composition of claim 1, wherein the composition has a suspensibility of at least 10%.

8. The aqueous suspension composition of claim 1, wherein the composition has a viscosity of at least 10 cps-3000 cps.

9. An aqueous suspension composition consisting essentially of at least one algae selected from green algae, red algae, golden algae, brown algae, golden-brown algae, blue algae, blue-green algae or their species, wherein the at least one algae is present in the range of 0.1%-65% by weight of the total composition; at least one surfactant in the range of 0.1%-50% by weight of the total composition; and at least one structuring agent in the range of 0.01%-5% by weight of the total composition; wherein the composition comprises particles suspended therein with a particle size is in the range of about 0.1 micron-60 microns, and one or more of microorganisms, pesticidal actives, fertilizers, water insoluble nutrients, macronutrients, micronutrients, biostimulants or mixtures thereof.

10. The composition of claim 9, wherein the composition further comprises at least one micronutrient in the range of 0.1% to 60% w/w of the total composition.

11. The aqueous suspension composition of claim 1, wherein the surfactant comprises one or more of emulsifiers, wetting agents and dispersing agents.

12. The aqueous suspension composition of claim 1, wherein the structuring agent comprises one or more of thickeners, viscosity modifiers, tackifiers, suspension aid, rheology modifiers and anti-settling agents.

\* \* \* \* \*